United States Patent [19]
Tanaka et al.

[11] Patent Number: 5,140,417
[45] Date of Patent: Aug. 18, 1992

[54] FAST PACKET TRANSMISSION SYSTEM OF VIDEO DATA

[75] Inventors: Tsutomu Tanaka, Nishinomiya; Masaru Fuse, Toyonaka; Hiroshi Yokota, Osaka, all of Japan

[73] Assignee: Matsushita Electric Co., Ltd., Osaka, Japan

[21] Appl. No.: 541,268

[22] Filed: Jun. 20, 1990

[30] Foreign Application Priority Data

Jun. 20, 1989 [JP] Japan ................................. 1-157758
Jun. 20, 1989 [JP] Japan ................................. 1-157760
Jun. 20, 1989 [JP] Japan ................................. 1-157761

[51] Int. Cl.⁵ .......................... H04N 7/12; H04N 7/04
[52] U.S. Cl. ...................................... 358/133; 382/56; 382/36; 358/141; 375/122
[58] Field of Search ............... 358/141, 136, 135, 133, 358/12, 105; 382/56, 36; 375/122; 364/725

[56] References Cited

U.S. PATENT DOCUMENTS

| | | | |
|---|---|---|---|
| 4,375,650 | 3/1983 | Tiemann | 358/133 |
| 4,504,860 | 3/1985 | Nicol et al. | 358/133 |
| 4,567,518 | 1/1986 | Driessen | 358/133 |
| 4,707,738 | 11/1987 | Ferre et al. | 358/133 |
| 4,875,094 | 10/1989 | Haghiri et al. | 358/133 |
| 5,001,561 | 3/1991 | Haskell et al. | 358/133 |

OTHER PUBLICATIONS

*Nikkei Electronics*, Jan. 11, 1988 No. 438, pp. 128–131.

Primary Examiner—James J. Groody
Assistant Examiner—Michael H. Lee
Attorney, Agent, or Firm—Price, Gess & Ubell

[57] ABSTRACT

A transmission system for packaging and transmission digital video data divides the data into a first group of components which would cause image quality to be drastically damaged if discarded, and a second group of components which would cause little damage if discarded. Data cells are composed for each group of components, and a priorty level is assigned giving a high priority to the first group of components and a low priority to the second group of components. The data is sent and received, and the received data is classified in accordance with the priority levels. If it is necessary to discard low priority components, a compensating device compensates for the discarded cells to ensure a constant image transmission across a congested channel.

18 Claims, 26 Drawing Sheets

FAST PACKET TRANSMISSION SYSTEM OF VIDEO DATA

BACKGROUND OF THE INVENTION

1. Field of the Invention

This invention relates to a fast packet transmission system of video data for packeting and transmitting digital video data and further for transmitting a plurality of videos by asynchronous time division multiplex.

2. Description of the Prior Art

ATM (asynchronous transfer mode) transmission is now attracting attention as a way of transmission on broadband ISDN (integrated services digital network). FIG. 1 is a conceptual view of ATM transmission. FIG. 2 shows the difference between ATM and STM (synchronous transfer mode) transmission.

ATM transmission is mentioned in detail *Nikkei Electronics* (Jan. 11, 1988; No. 438, pages 121-137).

Briefly speaking, ATM transmission is a transmission system in which a fixed length (for example, 53 bytes) of cells, each with a header, are multiplexed on a transmission channel. Practical transmission speed can be changed by changing the number of the cells to be transmitted.

The concept of ATM transmission provides fast transmission by removing what has prevented fast transmission in the conventional packet switching and by adopting the technology accumulated in the field of channel switching.

Packet transmission conforming to X.25 is suitable for bursty data transmission and is high in flexibility. In other words, data can be transmitted at any desirable time. However, its complicated protocol limits fast transmission.

In ATM transmission, the data to be transmitted is divided into short blocks and multiplexed. Each block has a header indicating an address. The block with a header is called a cell. In the service network, each cell is delivered with reference to the address in the header. Sequential data such as voice or video are also divided into cells and restored into the original sequential data by the addressee. A conventional packet is also divided into cells as well.

Research and development in high-efficiency coding of video signals has been getting active due to the introduction of ATM transmission. ATM transmission has solved many of the problems that were previously inevitable in this field. The conventional high-efficiency coding requires absolutely uniform transmission speed. According to ATM transmission, it is possible to transmit any amount of data whenever necessary. Therefore, transmission speed can be greatly changed. This feature realizes high-efficiency coding irrespective of transmission speed with no practical image quality deterioration.

The current standard TV signals requires the speed of approx. 100 Mb/s if A/D-converted and transmitted without high-efficiency coding. The basic philosophy of high-efficiency coding is to omit redundant signals in order to reduce the amount of data to be transmitted. For example, transmission of a still picture does not require sending the same data in repetition. ATM transmission makes it possible to send a moving picture at 100 Mb/s and a still picture at a speed of zero.

In this way, ATM transmission realizes highly efficient transmission of variable-rate-coded video signals with no practical image quality deterioration.

However, ATM transmission has a problem. Since overflow control is eliminated in order to enhance switching speed and the buffer memory capacity is small in the ATM transmission network, an overflow at a multiplexing or a switching device results in cell discard. Then, high-efficiency-coded data partially fall off at random, which drastically deteriorates image quality. The conventional coding of video signals offers no sufficient solution of cell discard.

Transmission of video data will be described in more detail referring to an example. Video data transmission is applied to, for example, railroad and freeway monitoring systems. In such systems, monitoring spots are arranged serially. FIG. 3 shows a conventional bus-type video transmission system using STM transmission, the system comprising a multiplicity of cameras connected serially (Electronic Data Communication Society's 70th Anniversary National Convention 1823; Mr. Tanabhe et al.) In a sending terminal, a video signal from a camera 1520 is encoded by a DPCM encoder 1519, and a signal 1518 from an adjacent terminal is inserted into an open arbitrary time slot among three channels by a TDMA multiplexer 1517. The multiplexed digital video signal is converted into an optical signal by an E/O converter 1513 for transmission. The signal received by a central unit 150 is converted into an electric signal by an O/E converter 1512 and divided into three signals by a TDMA demultiplexer 1505. These three signals are D/A-converted by DPCM decoders 1506 through 1508 and shot on screens of TV1 through TV3 (1509 through 1511).

The terminal is selected by inputting the terminal number by a camera controller such as a switching board 1502 or a JOY-STICK 1504. Then, a selection control signal is outputted from a CPU 1503. The selection control signal is sent to a receiver 1514 of the terminal through a driver 1501 and a twisted pair line. An SCC (single-chip computer) 1516 judges whether its own terminal has been selected. If its own terminal has been selected, the signal from the camera 1520 and another signal from another terminal are multiplexed by the TDMA multiplexer 1517. The selection control signal is conveyed also to the next terminal by a driver 1515.

According to the above conventional system, video signals are coded at a fixed rate of 32 Mb/s. Transmission speed is 8 Mb/s, and three DPCM video signals are multiplexed.

In the above system, three channels are available for all the terminals along the way. This figure is quite small despite the high speed of 128 Mb/s. This is because all video signals are coded by the fixed rate and thus unnecessary data is transmitted.

With ATM transmission, video signals variable-rate-coded in accordance with the kind of video are transmitted in more logical channels with no practical image quality deterioration.

In the above system comprising serially-connected terminals, a transmission channel may be almost or completely full with video cells sent from terminals far from the central unit. In other words, even if the video cells are generated at terminals closer to the central unit than a node at which the remaining transmission capacity gets to zero, those cells cannot be transmitted. Even with ATM transmission, by which transmission speed is variable depending on the number of cells to be transmitted, transmission speed is inevitably low for the terminals close to the central unit.

SUMMARY OF THE INVENTION

Accordingly, the present invention has an object of offering a useful fast packet transmission system of video data which solves the above problem.

Another object of this invention is to offer a transmission system which realizes fast packet transmission of video data with no practical image deterioration even if a cell is discarded due to an overflow of a transmission channel.

Still another object of this invention is to offer a novel sending terminal in which, when applied to a video monitoring system, a terminal close to a central unit can transmit data even if the coding rate is increased at each terminal and the transmission channel is full with data from terminals far from the central unit.

Still another object of this invention is to offer a sending terminal in which video cells are transmitted so that the video may be restored with no substantial image quality deterioration even if a cell is discarded during transmission.

Still another object of this invention is to offer a receiving terminal which optimally restores a video from video data sent from a sending terminal disclosed by this invention.

The above objects are fulfilled by a transmission system comprising a sending terminal for packaging digital video data into a cell and sending the same and a receiving terminal for receiving the cells and restoring a video, wherein a sending terminal comprises dividing means for dividing digital video data into a first group of components which would cause image quality a drastic damage if discarded and a second group of components which would cause little damage even if discarded; cell composing means for composing cells with each group of components; and priority level assigning means for assigning higher priority to the cell composed with the first group of components than to the cell composed with the second group of components; and a receiving terminal comprises cell classifying means for classifying received cells in accordance with priority levels; cell discard judging means for judging cell discard; and compensating means for compensating at least data of the discarded cell with a specified data in the case of cell discard.

According to this invention, if cell discard is demanded during transmission, cells other than the one composed with the first group are discarded. Since the cells composed with the groups other than the first group are low in their importance, their discard cause image quality no practical deterioration.

The above objects are also fulfilled by a video cell sending terminal for sending video cells to a transmission channel for use in a transmission system which is for packaging digital video data into a cell and transmitting the same, the terminal comprising classifying means for classifying digital video data into at least two groups of coefficients, a first of which would cause image quality a drastic damage if discarded and a second of which would cause little damage even if discarded; cell composing means for composing a cell with each group of coefficients; priority level assigning means for assigning a higher priority regarding cell discard prohibition to the cell composed of the first group of coefficients and a lower priority to the cell composed of the second group of coefficients; and sending means for sending out the cell which has been assigned a priority level.

The sending terminal may further comprise dividing means for dividing the digital video data into blocks each consisting of a plurality of pixels; and coding means for discrete-cosine-transforming the digital video data to convert the same into transform coefficients block by block; wherein the coefficients are divided into DC and low-frequency coefficients and high-frequency coefficients, and the cell composed with the DC and low-frequency coefficients is assigned higher priority and the cell composed with the high-frequency coefficients is assigned lower priority.

The sending terminal may further comprise dividing means for dividing the digital video data into pixel blocks each consisting of a plurality of pixels; and coding means for discrete-cosine-transforming the digital video data to convert the same into transform coefficients block by block; wherein the coefficients are divided into more significant bits and less significant bits, and the cell composed with the more significant bits is assigned higher priority and the cell composed with the less significant bits is assigned lower priority.

The sending terminal may further comprise dividing means for dividing the digital video data into pixel blocks each consisting of a plurality of pixels; and vector quantizing means for vector-quantizing the digital video data block by block using a retrieval tree; wherein the vector-quantized digital video data are divided into a first group of data which is obtained at a hierarchy level closer to a root of the retrieval tree and a second group of data which is obtained at another hierarchy level farther from the above root, and the cell composed with the first group of data is assigned higher priority and the cell composed with the second group of data is assigned lower priority.

The sending terminal may further comprise dividing means for dividing the digital video data into pixel blocks each consisting of a plurality of pixels; and vector quantizing means for obtaining an average value data of each pixel block and further vector-quantizing a data obtained by subtracting the average value data from each pixel of the pixel block to obtain indexes; wherein the cell composed with the average value data is assigned higher priority and the cell composed with the indexes is assigned lower priority.

The classifying means may classify the digital video data into sub-sampled pixel data and remaining pixel data; the priority level assigning means may assign higher priority to a first cell composed the sub-sampled pixel data and lower priority to a second cell composed of the remaining pixel data; and the cell sending means may send the second cell later than the first cell to assure the first cell arrives at a receiving terminal earlier than the second cell.

The sending terminal may further comprise dividing means for dividing the digital video data into pixel blocks each consisting of a plurality of pixels; and vector quantizing means for gain/shape vector-quantizing the digital video data block by block to obtain shape vector quantizing indexes and gain vector quantizing indexes; wherein the cells composed with the shape vector quantization indexes is assigned a higher priority and the cell composed with the gain VQ indexes is assigned a lower priority.

The sending terminal may further comprise dividing means for dividing the digital video data into pixel blocks each consisting of a plurality of pixels; and BTC (block truncation coding) means for obtaining an average value, bit data, each bit of which indicating whether each pixel data is larger or smaller than the average value, and a standard deflection of the digital video data; wherein data indicating the average value are classified as a first group of data and the bit data and the standard deflection are classified as a second group of data, and the cell composed with the first group of data is assigned higher priority and the cell composed with the second group of data is assigned lower priority.

The sending terminal may further comprise sequential number providing means for providing a plurality of cells obtained by segmenting a video packet with sequential numbers from the leading cell.

The above objects are also fulfilled by a video cell receiving terminal for receiving video cells and for restoring a video, the terminal being for use in a transmission system for packaging digital video data into a cell and transmitting the same, the terminal comprising priority level judging means for judging priority levels of video cells; cell classifying means for classifying the video cells in accordance with the priority levels; discarded data compensating means for judging whether a cell having lower priority has been discarded and in the case of cell discard, compensating data of the discarded cell with data of existent cells; and synthesizing means for synthesizing data from cells classified by the cell classifying means and data compensated by the discarded data compensating means into digital video data.

The discarded data compensating means may discriminate a sequential number written in a certain area of each cell and detects cell discard if any number is omitted.

The above objects are also fulfilled by a video cell receiving terminal for receiving video cells and for restoring a video, the terminal being for use in a transmission system for packaging digital video data into a cell and transmitting the same, the terminal comprising cell analyzing means for analyzing a header of a received cell and judging whether the cell is of moving-/still picture judgment data or not and whether the cell is assigned higher priority or lower priority regarding cell discard prohibition; transfer picture block data extracting means for detecting a transfer picture block based on the moving/still picture judgment data obtained by the cell analyzing means and extracting data from a cell of the transfer picture block among the cells with the higher priority; moving picture block data extracting means for extracting data from a cell of a moving picture block among the cells with the higher priority and the lower priority; discarded data compensating means for judging whether a cell having lower priority has been discarded and in the case of cell discard, compensating data of the discarded cell with data of existent cells; IDCT means for inverse-discrete-cosine-transforming data from cells of the transfer picture block and the moving picture block and the data compensated by the discarded data compensating means; and video restoring means for restoring a video of each frame based on the video data which is inverse-discrete-cosine-transformed by the IDCT means and on the moving/still picture judgment data.

The above objects are also fulfilled by a transmission system for packaging digital video data into a cell and transmitting the same, the system comprising a plurality of cell sending terminals having a function of dividing video data into a first cell group which would cause image quality a drastic damage if discarded and a second cell group which would cause little damage even if discarded; a central unit for restoring a video from data sent from the cell sending terminals; and a plurality of node devices for connecting the cell sending terminals and the central unit serially, each of the node devices having a priority cell multiplexing circuit for multiplexing the first group of cells, with priority, among cells sent from a terminal which is connected thereto and cells sent from another terminal which is connected to another node farther from the central unit than its own node device.

According to this invention, if a transmission channel is full in a video monitoring system, lower-priority cells are discarded. In this way, data from a terminal close to a central unit is sent without being prevented by data from a terminal far from the central unit. Further, variable coding rate of video data increases the number of available logical channels with no practical image quality deterioration.

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings:

FIG. 1 3 shows a construction of a cell decomposing section 107 of FIG. 4;

DESCRIPTION OF THE PREFERRED EMBODIMENTS

Embodiment I

Figure 1:
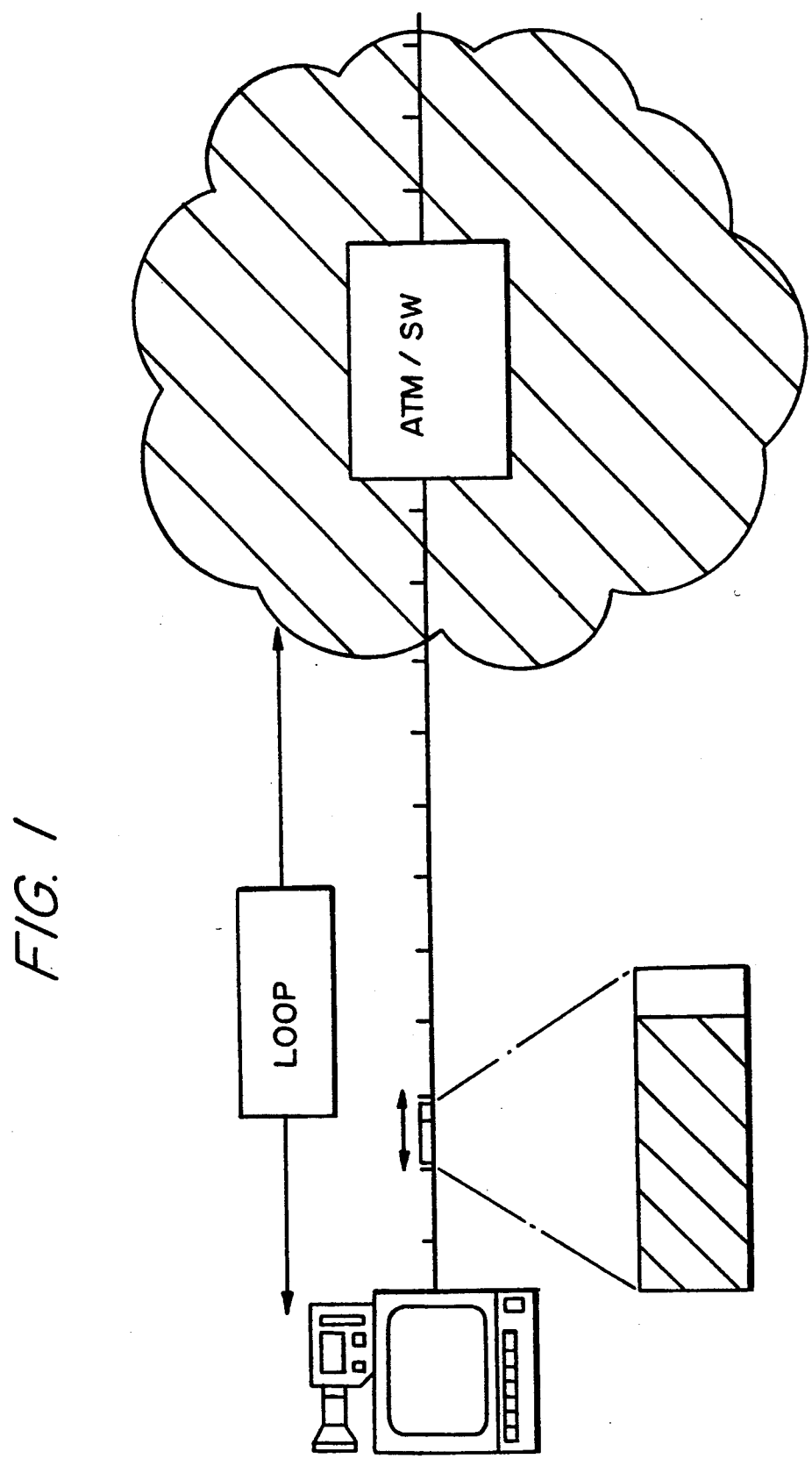
FIG. 1 is a conceptual view of ATM transmission.
Figure 2:
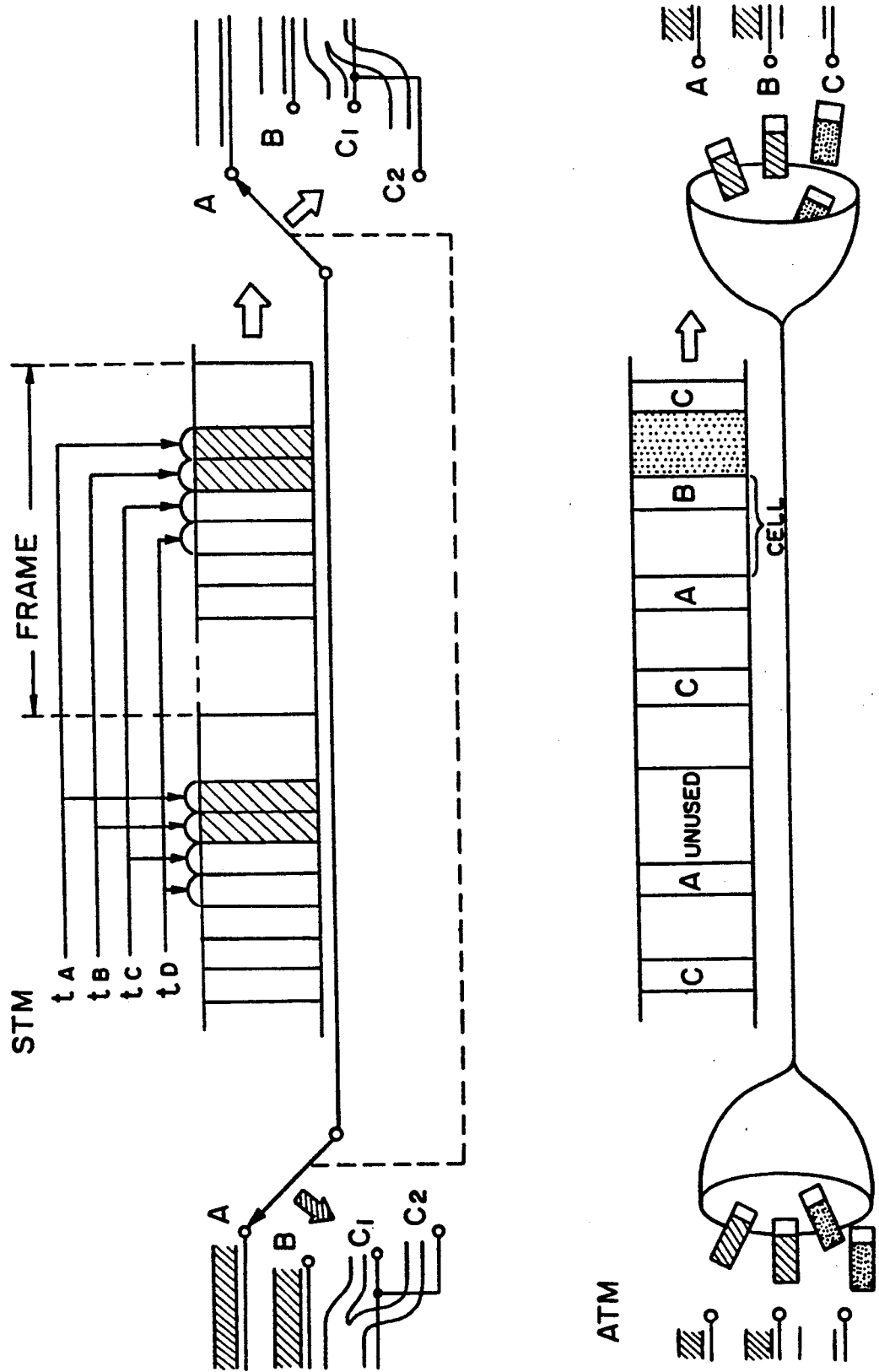
FIG. 2 shows the difference between ATM and STM transmission.
Figure 3:
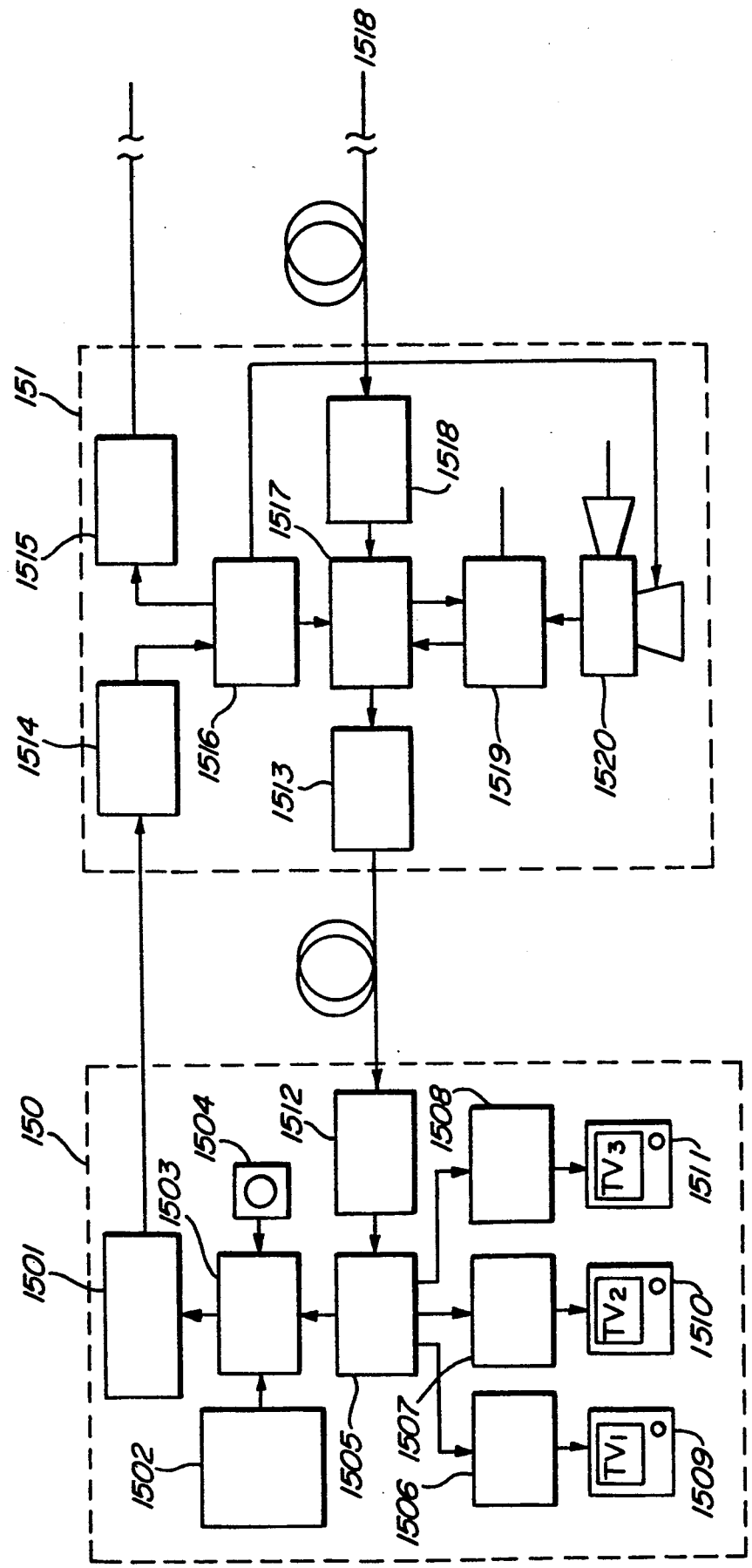
FIG. 3 is a block diagram of a conventional video monitoring system.
Figure 4:
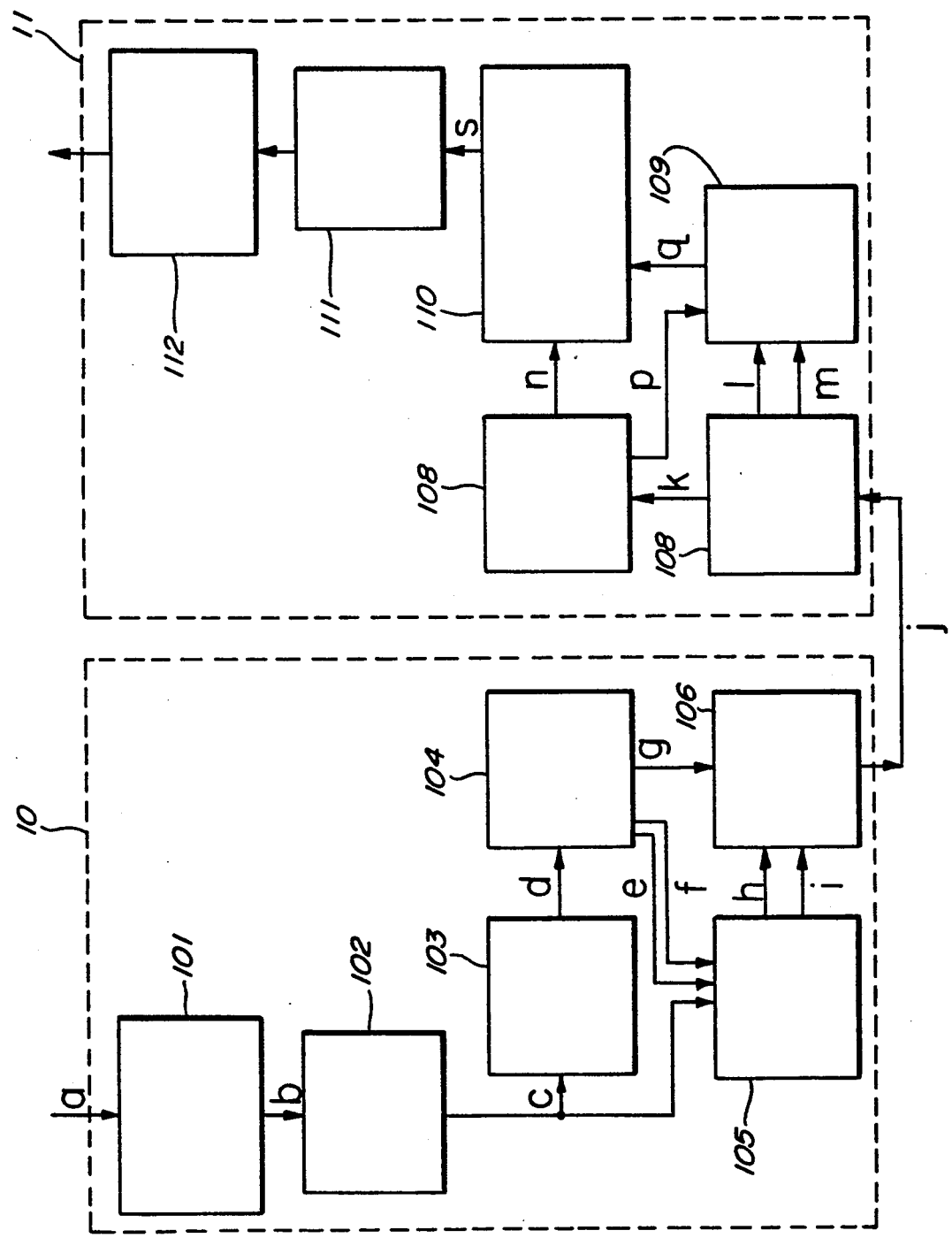
FIG. 4 is a block diagram of an embodiment according to this invention.

FIG. 4 is a block diagram of a first embodiment of a fast packet transmission system of video data according to this invention.

A sending terminal 10 and a receiving terminal 11 are connected to each other through a transmission channel j. Though not shown in the figure, a cell multiplexer and a packet switching board are allocated at appropriate positions on the transmission channel j.

The sending terminal 10 comprises an A/D converter 101, a pixel block forming section 102, a moving/still picture judging section 103, a first coding section 104, a second coding section 105 and a cell composing section 106.

The receiving terminal 11 comprises a cell decomposing section 107, a first decoding section 108, a second decoding section 109, a block data restoring section 110, a frame synchronizing section 111 and a D/A converter 112.

Construction and Operation of the Sending Terminal 10

The A/D converter 101, for which a known A/D converter is used, is for converting an analog video signal a of a current frame shot by a TV camera or the like (not shown) into a digital video data b.

The pixel block forming section 102 is for dividing the digital video data b which are sent line by line into 16-pixel blocks (4 pixels by 4 lines), and outputting a block data c for each block to a moving/still picture judging section 103. A block data consists of 16 pixel data. Since a known circuit is used for pixel block forming section 102, its detailed description will be omitted.

The moving/still picture judging section 103 is for comparing the data c of each block of the current frame with data from the corresponding block of a frame immediately prior to the present one (will be referred to as the prior frame, hereinafter), whereby judging whether each block is a moving picture block or a still picture block.

Figure 5:
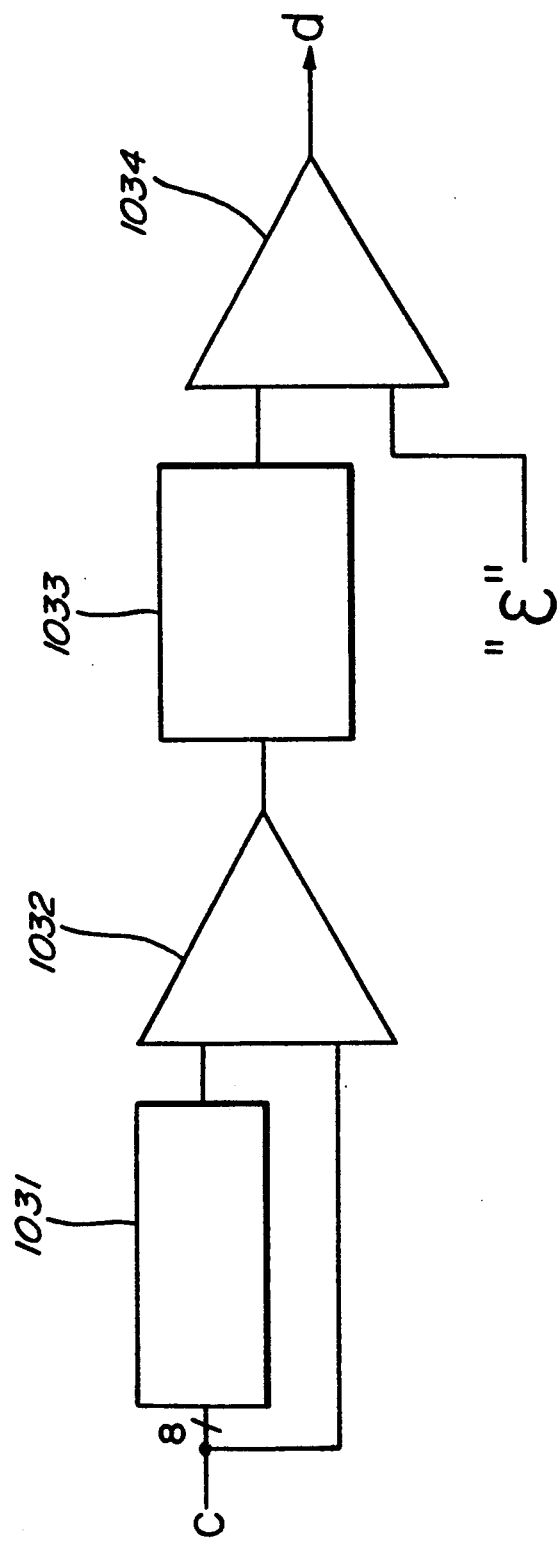
FIG. 5 shows a construction of a moving/still picture judging section 103 of the same.

A construction of the section 103 is shown in FIG. 5. A frame memory 1031 stores one frame of block data c. When the block data c of the current frame is inputted into the memory 1031, the corresponding block data of the prior frame is outputted. Then, a subtracting device 1032 subtracts each pixel data of the inputted block from the corresponding pixel data of the outputted block. An accumulating device 1033 sums up the subtraction results of each block. The comparator 1034 compares the summing-up result with the reference value $\epsilon$. If the summing-up result is the same as or larger than $\epsilon$, the block is judged to be a moving picture block and "1" is outputted. If the result is smaller than $\epsilon$, the block is judged to be a still picture block and "0" is outputted.

Figure 6A:
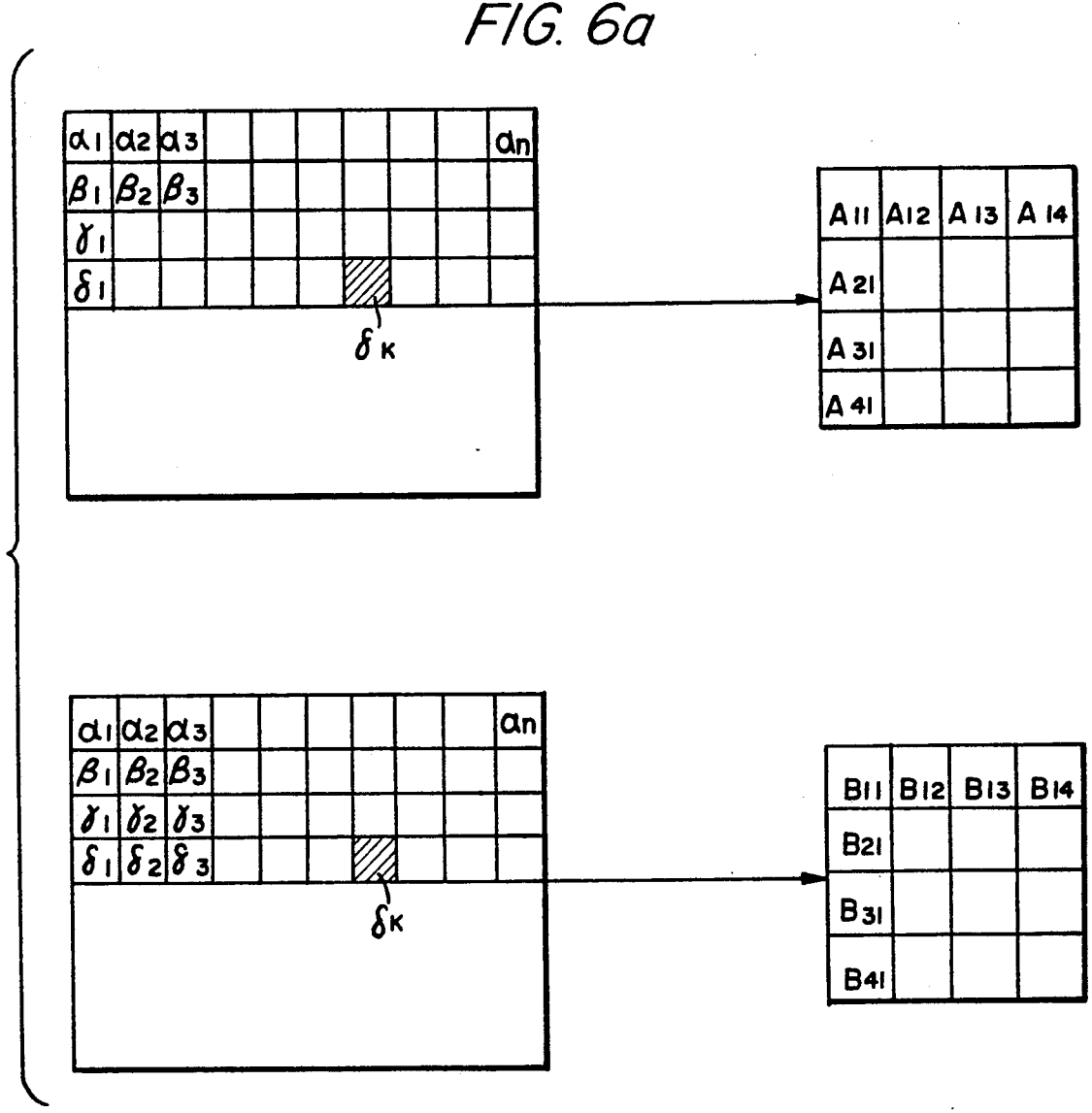
FIGS. 6a and 6b are views for explaining moving-/still picture judgment operation.
Figure 6B:
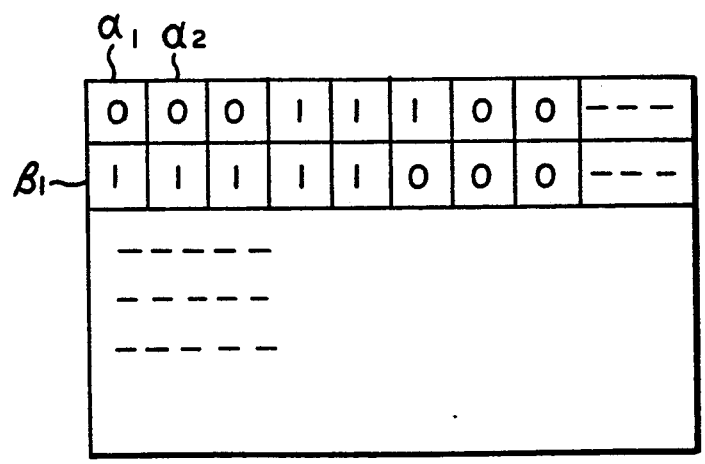

FIGS. 6a and 6b explain in detail how the above calculation is executed. Frame A is the prior frame, Frame B is the current frame, and a1, a2, . . . each indicate a block. Enlarged views of the $\delta$kth blocks of Frames A and B are shown on the right half of FIG. 6a. When the block data c of the kth block of Frame B is sent from section 102 to section 103, the subtracting device 1032 executes the following calculation using the pixel data of the $\delta$kth block of Frame B and those of Frame A, which are sent from the frame memory 1031 simultaneously.

$$S_{11} = A_{11} - B_{11} \\ S_{12} = A_{12} - B_{12} \\ S_{44} = A_{44} - B_{44}$$  (1)

The subtraction results of the block are summed up by the accumulating device 1033, the result of which is compared with the reference value $\epsilon$ in accordance with the following formula by the comparator 1034.

$$\sum_{i,j=1}^{4} |S_{ij}| = \sum_{i,j=1}^{4} |A_{ij} - B_{ij}| < \epsilon$$  (2)

If the summing-up result is the same as or larger than $\epsilon$, it is judged that there has been a change in the picture of the $\epsilon$kth block from Frame A to Frame B, namely, the picture is moving and "1" is outputted. Otherwise, the picture is judged to be still and "0" is outputted.

The judging section 103 carries out the above judgment for all the blocks, and each result is sent to the first coding section 104 as a moving/still picture judgment data d (as shown in FIG. 6b).

Incidentally, moving/still picture judgment may also be done based on the following formula.

$$\epsilon|A_{ij} - B_{ij}| < \epsilon$$  (3)

Figure 7:
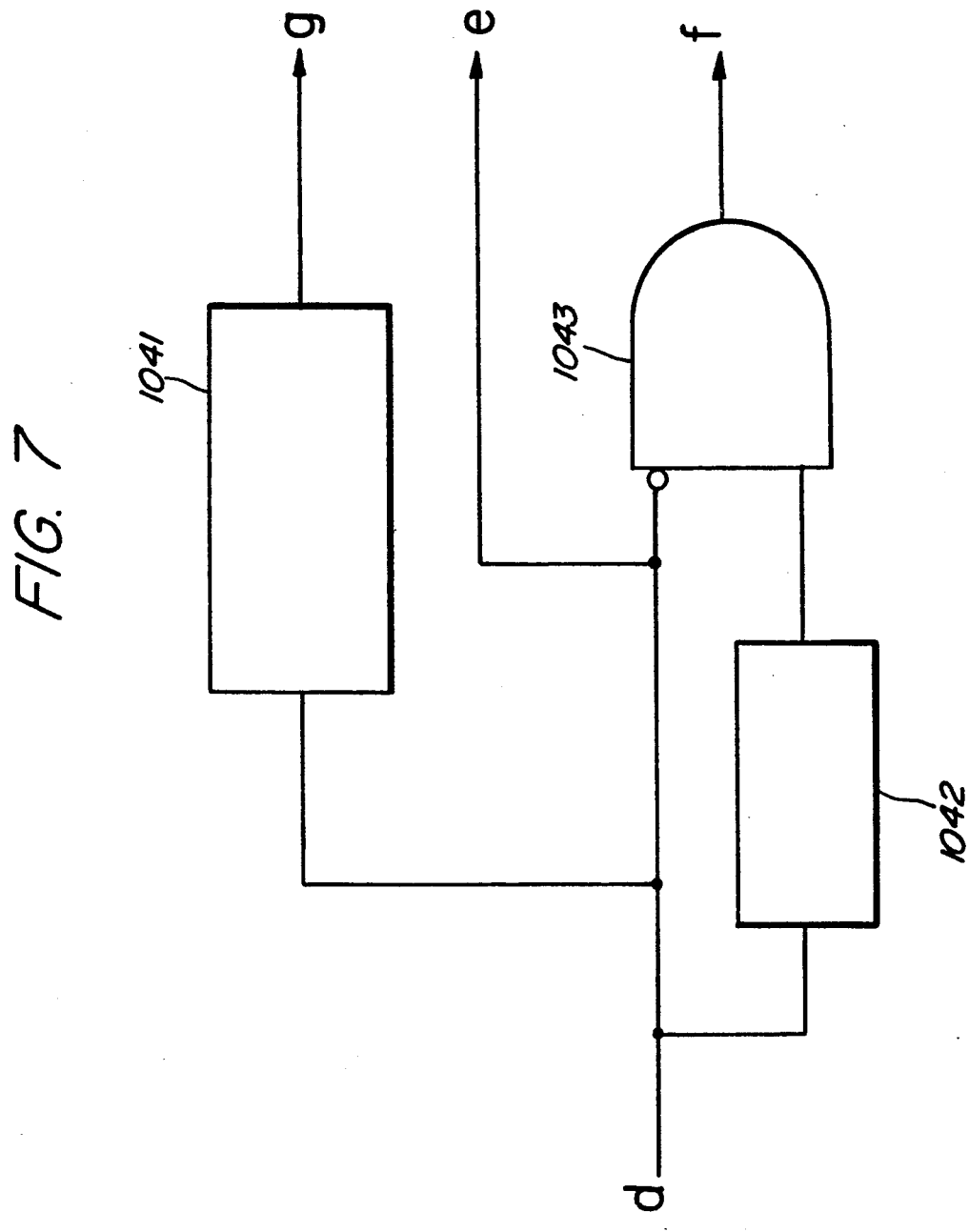
FIG. 7 shows a construction of a first coding section 104 of FIG. 4.

As shown in FIG. 7 the first coding section 104 comprises a runlength coder 1041, a memory 1042 for storing one frame of the moving/still picture judgment data d, and an AND circuit 1043.

The data d from the juding section 103 is coded by the runlength coder 1041 and outputted as a block data g to the cell composing section 106. The data d is also sent to the AND circuit 1043 after being inverted. The AND circuit 1043 obtains a logical product of the above-inverted data and the moving/still picture judgement data d of the corresponding block of the prior frame obtained from the memory 1042, thereby judging whether the block is a transfer picture block or not. (The transfer picture block is the very first still picture block which has just been altered from the moving picture block.) If it is judged to be a transfer picture block, "1" is sent to the second coding section 105 as a transfer picture block judgment data f. The data d is also sent with no conversion or coding to the section 105 as a moving picture block judgment data e.

The second coding section 105 is for discrete-cosine-transforming the pixel data of the moving picture block and the transfer picture block and also for dividing the transformed data into two groups—data which would drastically deteriorate image quality if discarded and data which would have little affect on image quality even if discarded.

Figure 8:
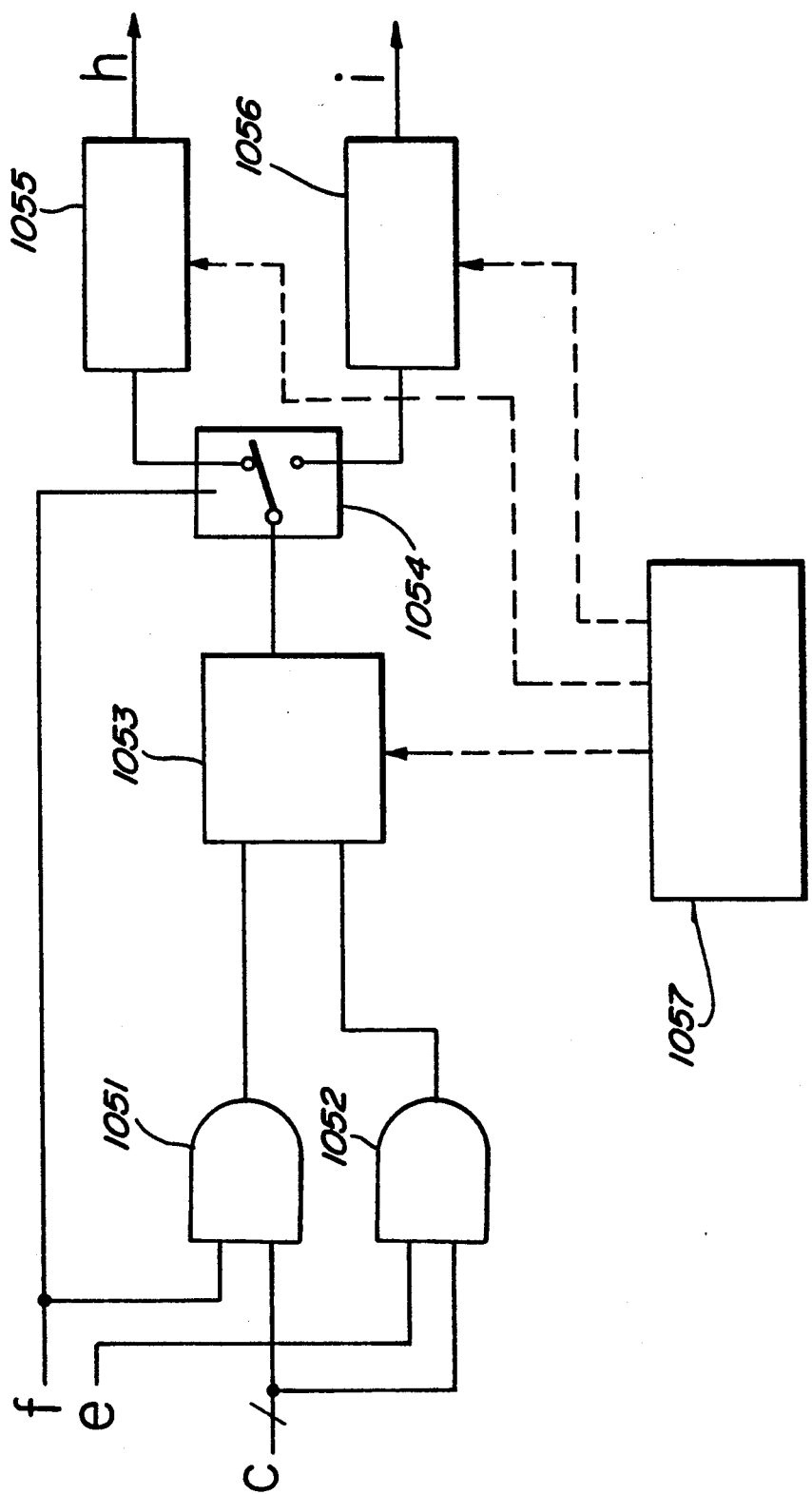
FIG. 8 shows a construction of a second coding section 105 of FIG. 4.
Figure 9:
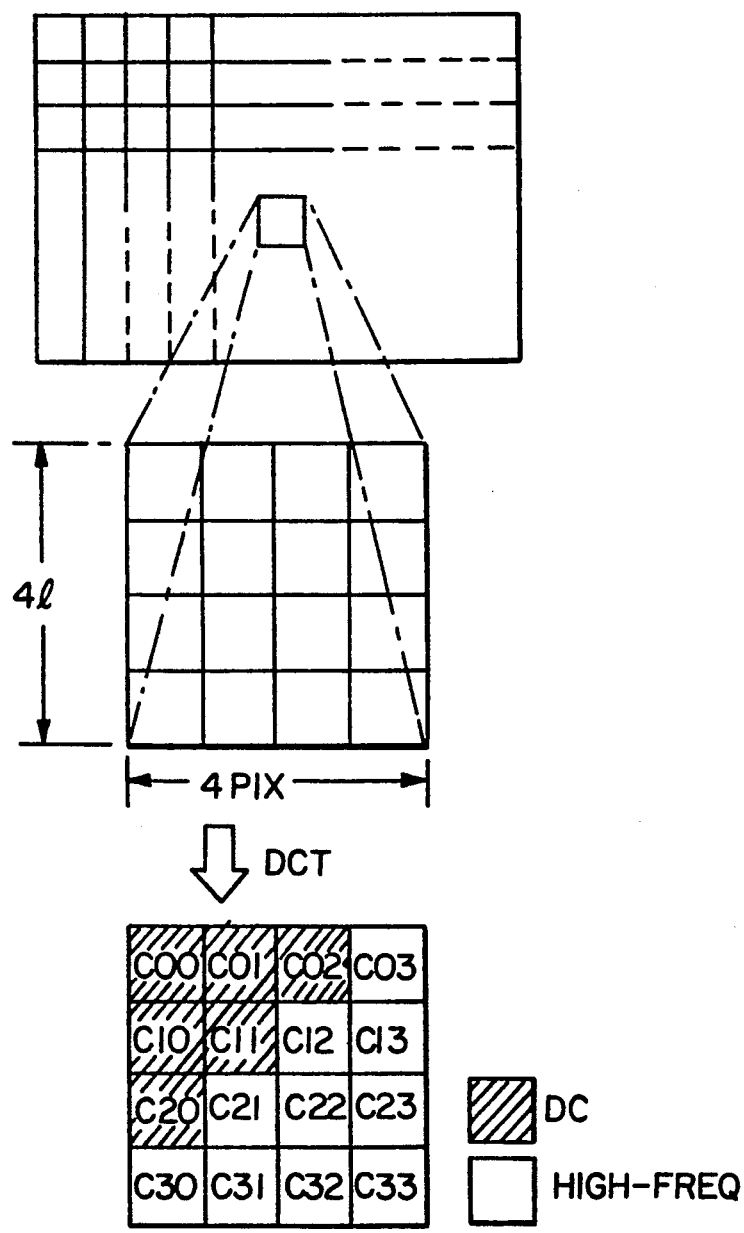
FIG. 9 is a view for explaining operation of the second coding section 105.

A construction of the second coding section 105 is shown in FIG. 8. An AND circuit 1051 has its gate opened by the transfer picture block judgment data f and provides a DCT 1053 with the block data c of the transfer picture block. Another AND circuit 1052 has its gate opened by the moving picture block judgment data e and provides the DCT 1053 with the block data c of the moving picture block. The DCT 1053 is a known circuit for executing discrete cosine transform (DCT), which means converting the 16 pixel data within a block into 16 coefficients C00, C01, C10, ... C32 and C33 of two-dimensional frequency components as shown in FIG. 9. The shaded coefficients C00, C01, C02, C10, C11 and C20 indicate the values of DC and low-frequency components, which would drastically deteriorate the image quality if discarded. The others indicate the values of high-frequency components, which would have little affect on the image quality even if discarded.

A switch 1054 handles the coefficients of the components of the moving picture block and those of the transfer picture block differently. In the case of the moving picture block, the coefficients of the DC and low-frequency components are inputted to a first Huffman coder 1055 and those of the high-frequency components are inputted to a second Huffman coder 1056. As for the transfer picture block, the coefficients of all the components are inputted to the first Huffman coder 1055. (Hereinafter, the coefficients of the DC and low-frequency components will be referred to as DC and low-frequency coefficients, and those of the high-frequency components will be referred to as high-frequency coefficients.) As will be described in more detail later, the coefficients coded by the first Huffman coder 1055 are to be packed into cells having higher priority regarding cell discard prohibition. It means these cells have low possibility of being discarded during transmission. On the other hand, the coefficients coded by the second Huffman coder 1056 are to be packed into cells having lower priority, which means it is highly possible for these cells to be discarded during transmission. With such classification concerning the moving picture block, image quality deterioration is kept little as possible even if a cell is discarded. Concerning the transfer picture blocks, however, the coefficients of all the components are coded by the first Huffman coder 1055 because no cell should be discarded for the following reason.

As mentioned before, a transfer picture block is the very first still picture block which has just been altered from the moving picture block. A sequence of still pictures is realized by duplicating the transfer picture block in repetition. Human eyes are sensitive enough to recognize even tiny details when watching a still picture. Accordingly, the transfer picture block should be restored clearly even in extreme detail.

A timing circuit 1057 controls operation timing of the DCT 1053 and the Huffman coders 1055 and 1056.

The data coded by the first Huffman coder 1055 and the second Huffman coder 1056 are both sent to the cell composing section 106 as data h and i, respectively. As the first and the second Huffman coders 1055 and 1056 are known devices, their detailed explanation will be omitted.

The cell composing section 106 is for composing cells using the data g, h and i independently and sending them to the transmission channel j.

Figure 10:
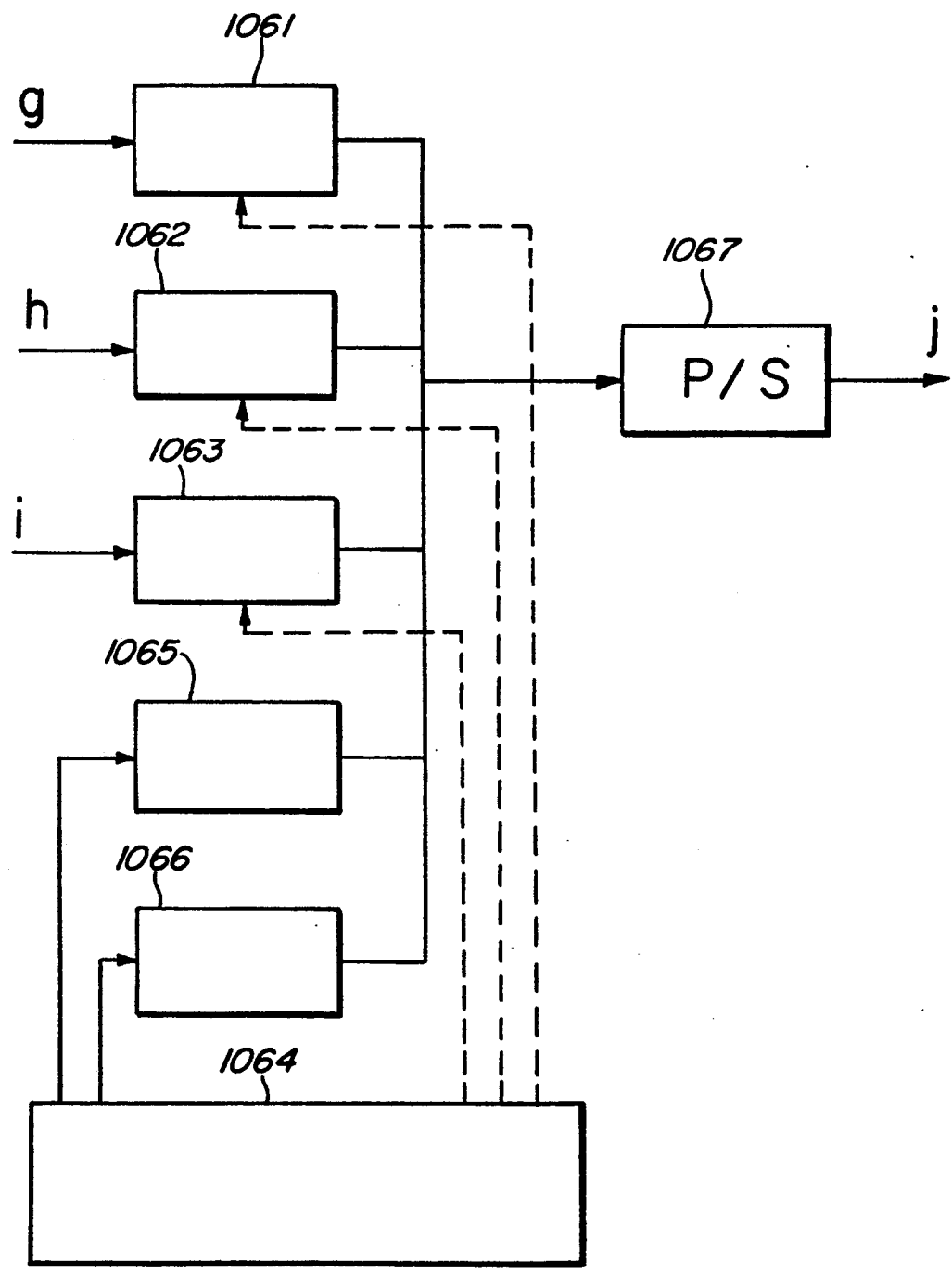
FIG. 10 shows a construction of a cell composing section 106 of FIG. 4.
Figure 11:
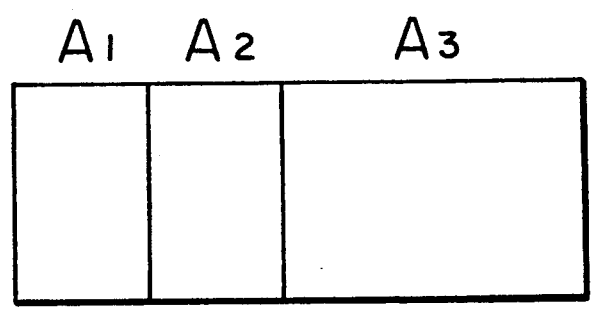
FIG. 11 shows a construction of a cell.

FIG. 10 shows a construction of the cell composing section 106. The data g, h and i are inputted to memories 1061, 1062 and 1063, respectively. When a fixed amount of data is accumulated, each memory sends a ready signal to a controlling section 1064. Then, the section 1064 commands an ATM cell header generating section 1065 to send an ATM cell header and then commands an AAL header generating section 1066 to send an AAL (ATM adaptation layer) header, thereafter sending an enable signal to the memory which has sent the ready signal. In this way, a cell is composed. The cell is converted into a serial signal by a P/S (parallel/serial) converter 1067 to be sent to the transmission channel j. As shown in FIG. 11, the cell is comprised of an ATM cell header $A_1$, an AAL header $A_2$ and an information field $A_3$, in which the data g, h or i is written. The ATM cell header A1 has an area for storing an address, another area indicating its priority level, and still another area indicating whether the cell is of the moving/still picture judgment data or not. When generating an ATM cell header, the section 1065 writes the priority level and whether the cell is of the moving/still picture judgment data or not $A_2$ and $A_3$. Since only one bit is allocated for the priority level usually, only two levels are written If more bits are allocated, three or more levels can be written. In this embodiment, the cell bearing the data from the memory 1061 or 1062 is given higher priority, and the cell bearing the data of the memory 1063 is given lower priority. The switching board and the cell multiplexer on the transmission channel j decide which cell must not be discarded by reading $A_2$. $A_3$ is allocated one bit. If the cell is of the moving/still picture judgment data, "1" is written and if not, "0" is written.

Figure 12:
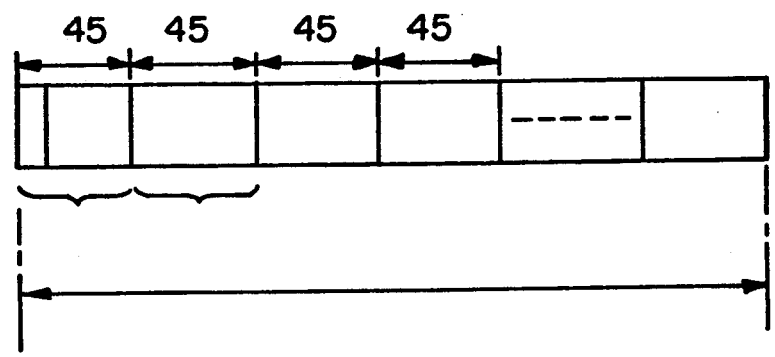
FIG. 12 shows relationship between a payload of a cell and a packet.

As shown in FIG. 12, a packet of data sent from the memory 1061, 1062 or 1063 is segmented by the capacity of one information field $A_3$ (45 octets in this case). The leading cell of a packet has a data indicating the number of its block row (from top of the frame). A data indicating whether the cell is leading the packet or not and another data indicating the relationship between that cell and the adjacent one (sequential number of the cell) are written in the AAL header $A_2$. The receiving terminal 11 detects which cell has been discarded by reading $A_2$.

Construction and Operation of the Receiving Terminal 11

The cell decomposing section 107 is for analyzing the ATM and AAL headers of the cell which has been sent thereto through the transmission channel j and for removing the headers and storing the data from the information field $A_3$ in either of memories therein.

Figure 13:
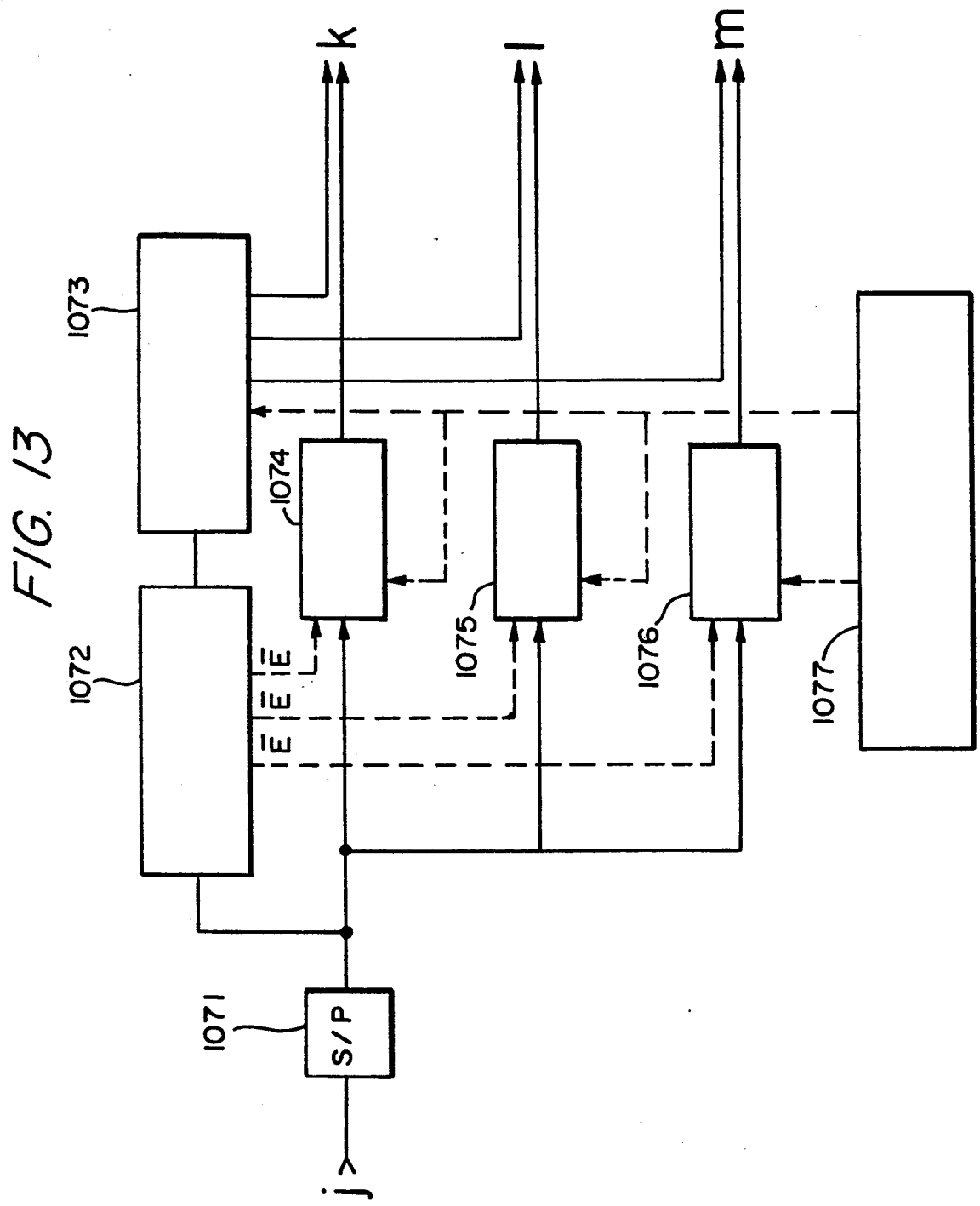

A construction of the section 107 is shown in FIG. 13. The cell which has been sent to the section 107 through the channel j is converted into a parallel signal by an S/P converter 1071. The ATM cell header $A_1$ is analyzed by an ATM header analyzing section 1072, whereby it is judged whether the cell is of the moving/still picture data or not and whether the cell is assigned higher priority or lower priority. The moving/still picture judgment data is stored in a memory 1074, the data in the higher-priority cell in a memory 1075, and the data in the lower-priority cell in a memory 1076. The AAL header $A_2$ is analyzed by an AAL header analyzing section 1073, whereby it is judged whether the cell is leading the packet or not and whether any cell has been discarded during transmission. If any cell has been discarded, the section 1073 outputs a discard notice instead of its data. A controlling section 1077 controls timing of reading out from the memories 1074 through 1076 and of outputting the discard notice from the section 1073.

The data read from the memory 1074 is outputted to the first decoding section 108 as a data k, and the data from the memories 1075 and 1076 are outputted to the second decoding section 109 as data l and m, respectively.

Figure 14:
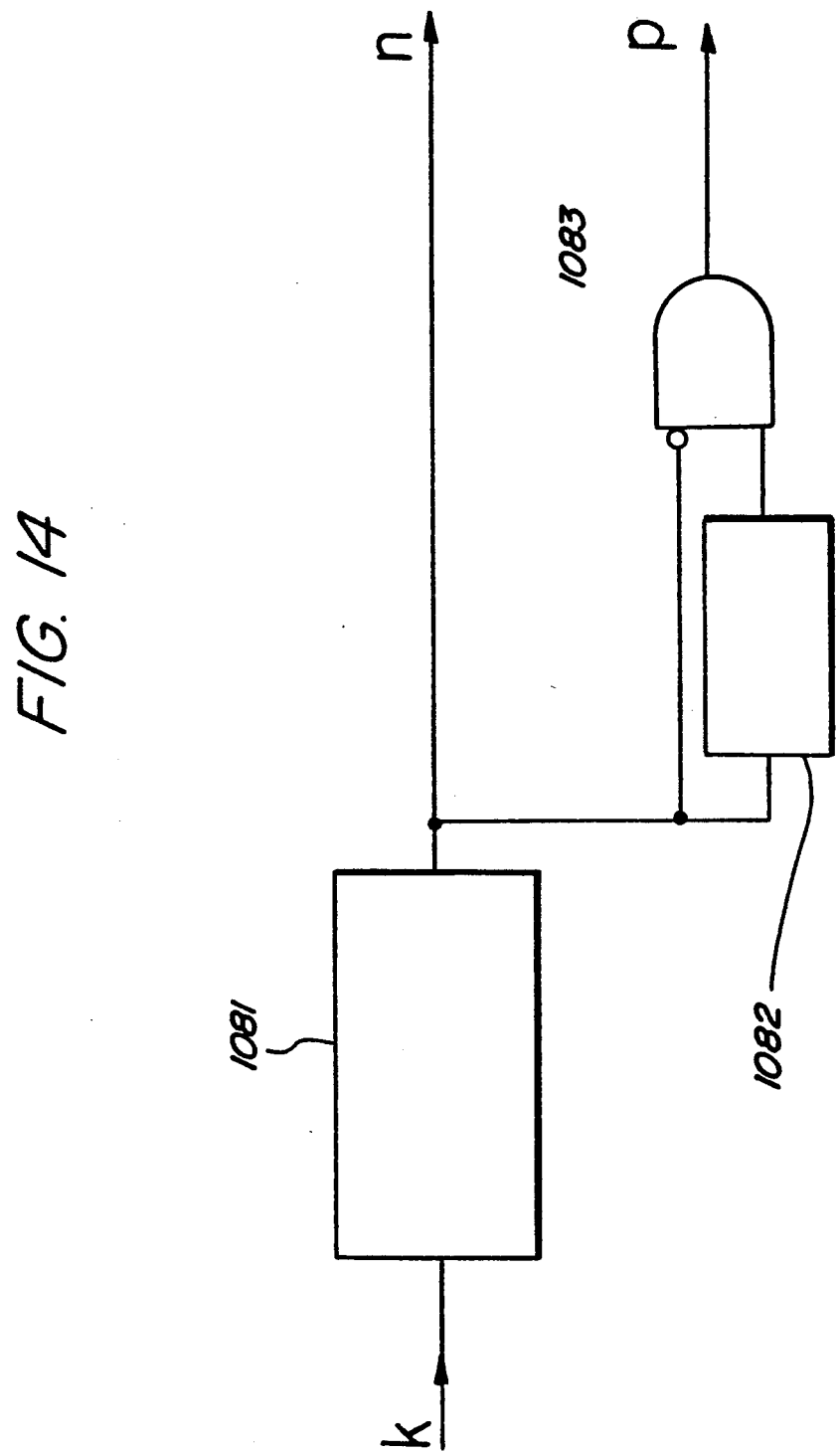
FIG. 14 shows a construction of a first decoding section 108 of FIG. 4.

A construction of the section 108 is shown in FIG. 14. The data k is runlength-decoded by a runlength decoder 1081. The memory 1082 and the AND circuit 1083 detect a transfer picture block and output a transfer picture block judgment data p by the same principle as explained concerning the first coding section 104. As well as the data p to be sent to the second decoding section 109, the decoder 1081 sends a moving/still picture judgment data n to the block data restoring section 110.

Figure 15:
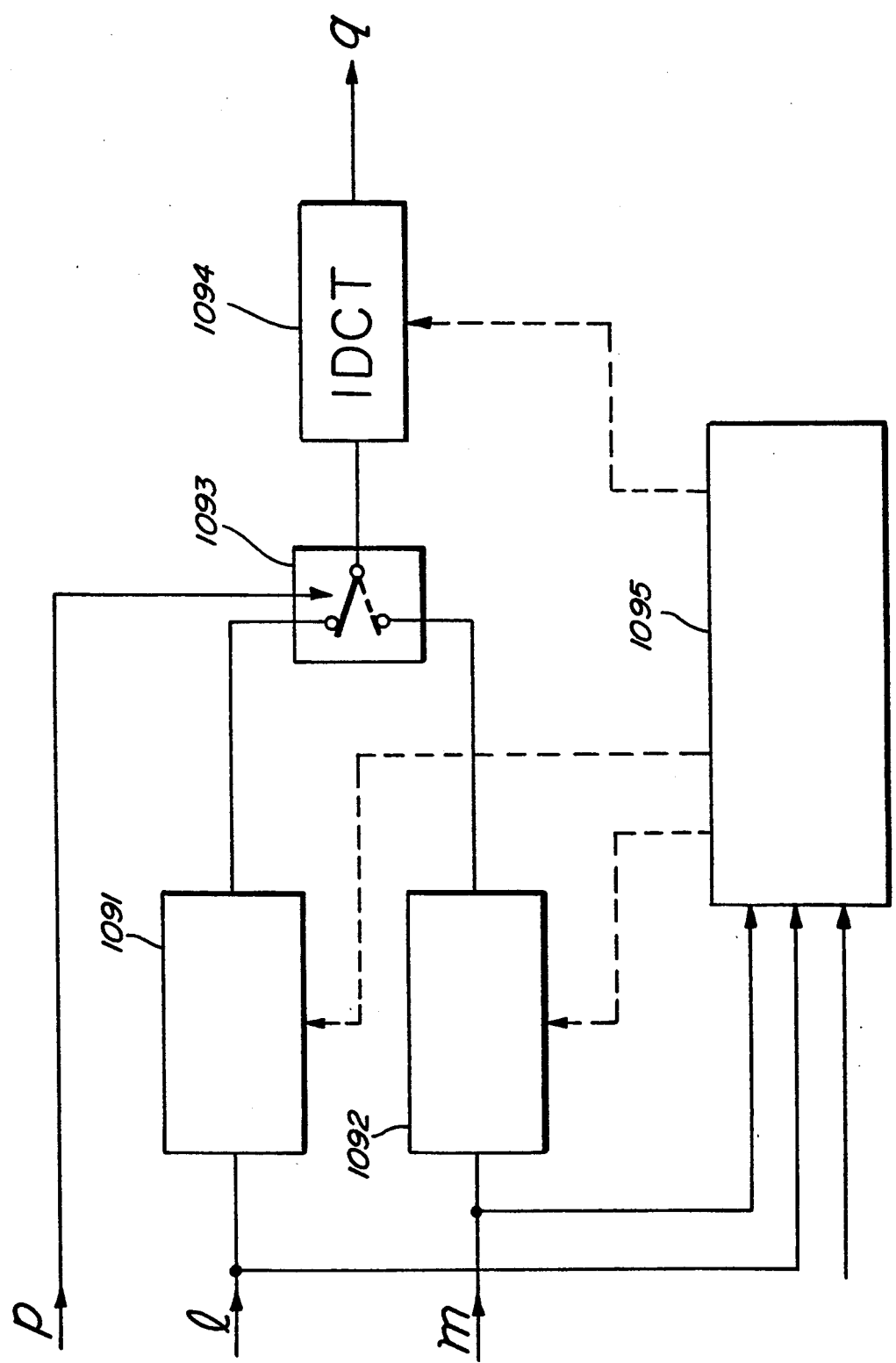
FIG. 15 shows a construction of a second decoding section 109 of FIG. 4.

The second decoding section 109 is for restoring the moving picture block and the transfer picture block based on the data l, m and p. FIG. 15 shows a construction of the section 109. The data l of the higher-priority cell is decoded by a first Huffman decoder 1091 and the data m in the lower-priority cell is decoded by a second Huffman decoder 1092. Both decoded data are sent to a switch 1093. The switch 1093 is operated in the same way as explained concerning the second coding section 105. In other words, it is usually switched over between the outputs from the decoders 1091 and 1092. In regard to the transfer picture block judgment data p, however, the switch 1093 sends the output only from the first Huffman decoder 1091 to an IDCT 1094. The IDCT 1094 inverse-discrete-cosine-transforms the data sent from the switch 1093. Thanks to the above operation of the switch 1093, the data of the moving picture block and the transfer picture block are each restored by the IDCT 1094 into a block data q. It should be noted that it is only when no cell has been discarded through the transmission channel j that all the block data are accurately restored. If any cell has been discarded, a discarded notice is inputted to a controlling section 1095. The controlling section 1095 judges which packet the discarded cell belonged to, based on the notice and the block row number, and then commands the relevant Huffman decoder to clear the data of the relevant packet. Since only the lower-priority cells can be discarded in this embodiment, the controlling section 1095 sends the above command to the second Huffman decoder 1092. The packet including the discarded cell consists only of the lower-priority cells. Accordingly, the discard of that packet has little affect on image quality except that the resolution (frequency characteristic) of the moving picture is lowered. Since human eyes are not sensitive to high-frequency components of moving pictures, practical image quality deterioration is small.

Figure 16:
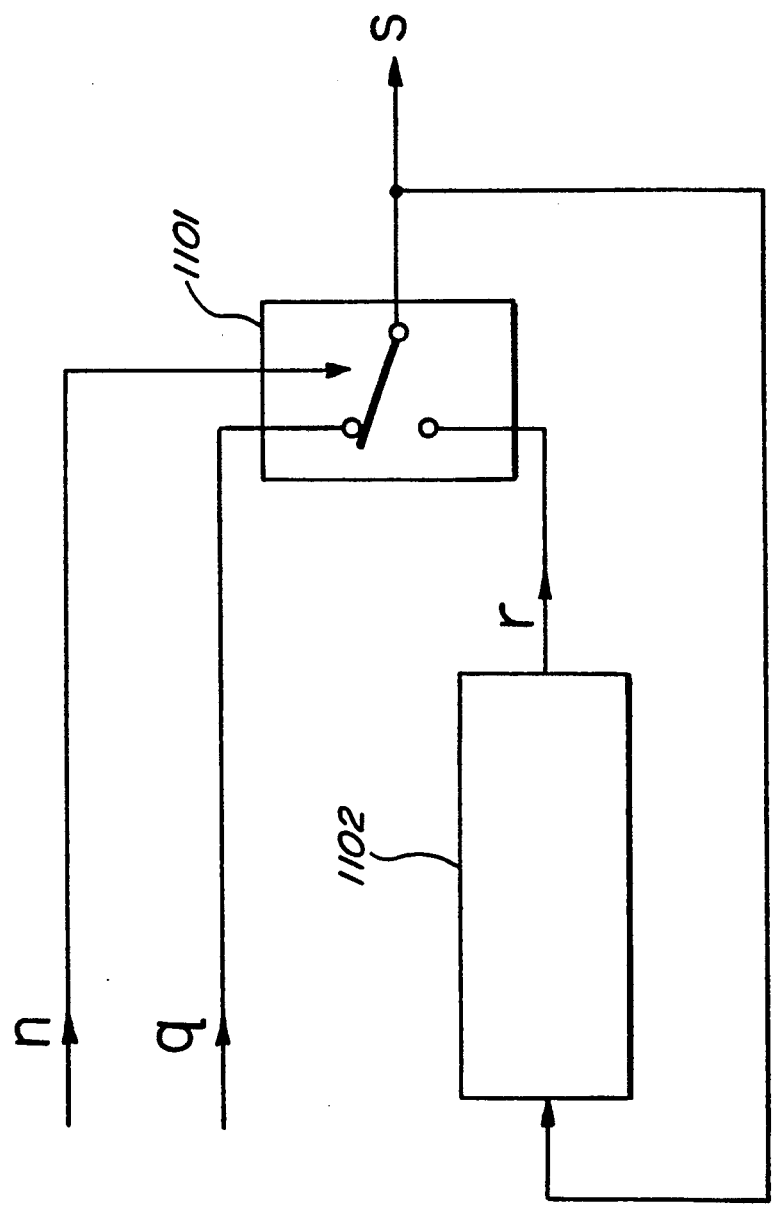
FIG. 16 shows a construction of a block data restoring section 110 of FIG. 4.
Figure 17A:
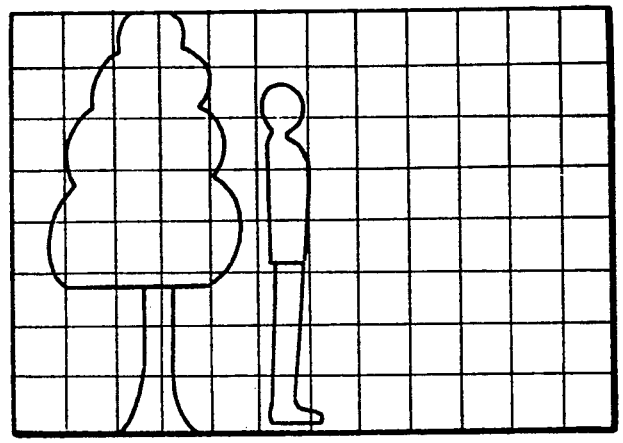
FIGS. 17a and 17b are views for explaining operation of the block data restoring section 110.
Figure 17B:
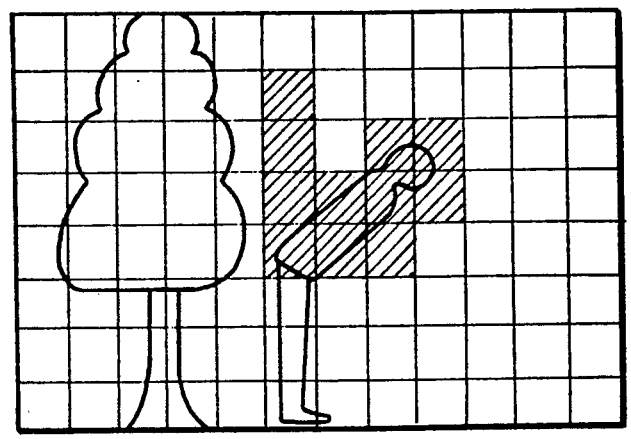

The block data restoring section 110 is for restoring one frame of block data FIG. 16 shows a construction of the section 110. When the data n is "1" (moving picture), a switch 1101 sends the data q to a frame synchronizing section 111 as a data s. When the data n is "0" (still picture), block data r of the corresponding block of the prior frame is sent out from a memory 1102. As a result, the switch 1101 sends out block data of a current frame consisting of moving picture blocks formed of the data in the newly sent cells and the still picture blocks formed by duplicating the block data of the prior frame. FIGS. 17a and 17b explain the operation of the section 110 The image of FIG. 17a, in which a person is standing upright, is stored in the memory 1102. FIG. 17b shows a person bowing. The shaded blocks that have changed from those of FIG. 17a, are moving picture blocks, and the remaining blocks are still picture blocks. The block data restoring section 110 duplicates the data stored in the memory 1102 for the still picture blocks and employs the data sent in the new cells for the moving picture blocks.

The block data of the current frame sent from the switch 1101 is outputted to the frame synchronizing section 111 and also to the memory 1102 at the same time. In this way, the data of the memory 1102 are updated on a block-by-block basis.

The frame synchronizing section 111 is for synthesizing the restored block data into digital video data and further for adding a synchronization signal to the digital video data. The digital video data added with the synchronization signal is converted into an analog signal by the D/A converter 112 and outputted to a CRT display or the like (not shown). As the frame synchronizing section 111 and the D/A converter 112 are known devices, their detailed explanation will be omitted.

Although the priority level is contained in the cell header in this embodiment, it is also possible to group cells with the same priority level and annex the level to the whole group.

Although the moving picture block data coefficients of the digital video data are divided into two groups in the above embodiment, they may be divided into three or more groups.

Embodiment II

In Embodiment I, the DCT coefficients are divided into the low-frequency coefficients and the high-frequency coefficients for giving them different priority levels. In a second embodiment, the DCT coefficients are divided into more significant bits and less significant bits for different priority levels. Except for the second coding section 105 and the second decoding section 109, the whole system has the same construction as Embodiment I. In the second coding section 105, the more significant 6 bits and the less significant 2 bits of the DCT coefficients are converted into variable-size codes by the first Huffman coder 1091 and the second Huffman coder 1092, respectively. In the second decoding section 109, the more significant 6 bits and the less significant 2 bits which have been sent from the above two Huffman coders are first synthesized and then inverse-discrete-cosine-transformed.

If a lower-priority cell is discarded during transmission, the second decoding section 109 replaces the less significant 2 bits with "0" for executing IDCT (inverse discrete cosine transform.) The discard of the lower-priority cell deteriorates gradation of the moving pictures. However, since human eyes are relatively insensitive to moving pictures, the image quality is not practically affected.

Embodiment III

Figure 18:
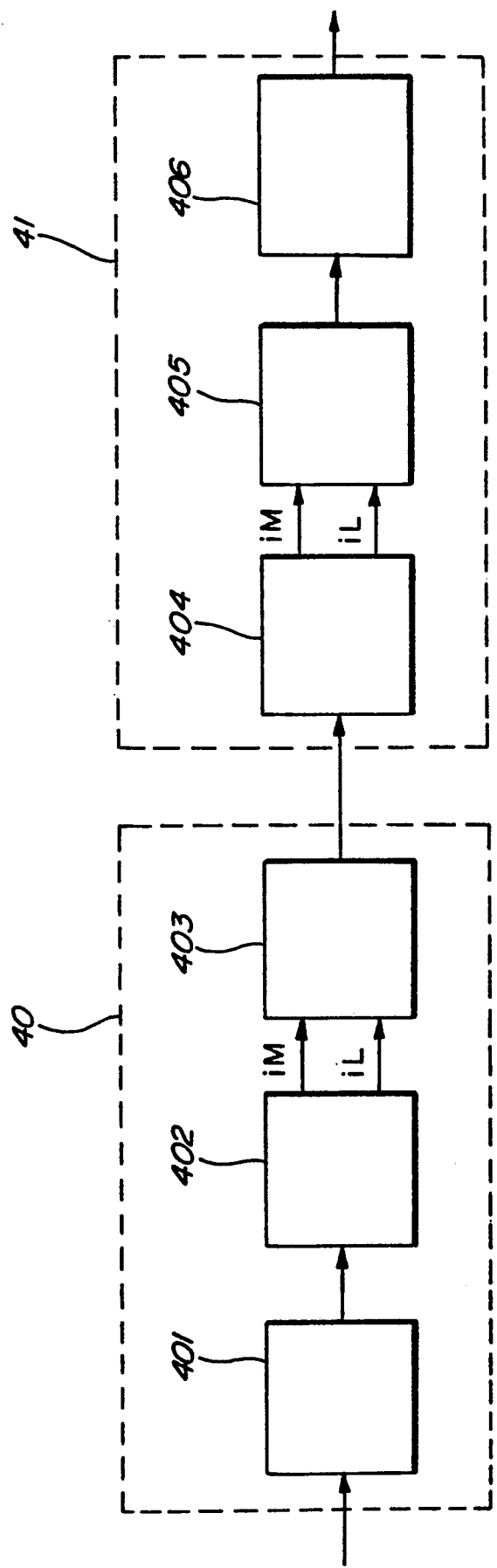
FIG. 18 is a block diagram of another embodiment according to this invention.

FIG. 18 is a block diagram of a third embodiment according to this invention. Instead of DCT employed in Embodiments I and II, vector quantization (VQ) is carried out in this embodiment for image processing. Since the sending and the receiving terminals of this and the following embodiments have the same construction with those of Embodiment I or comprise known circuits, their detailed explanation will be omitted.

Figure 19:
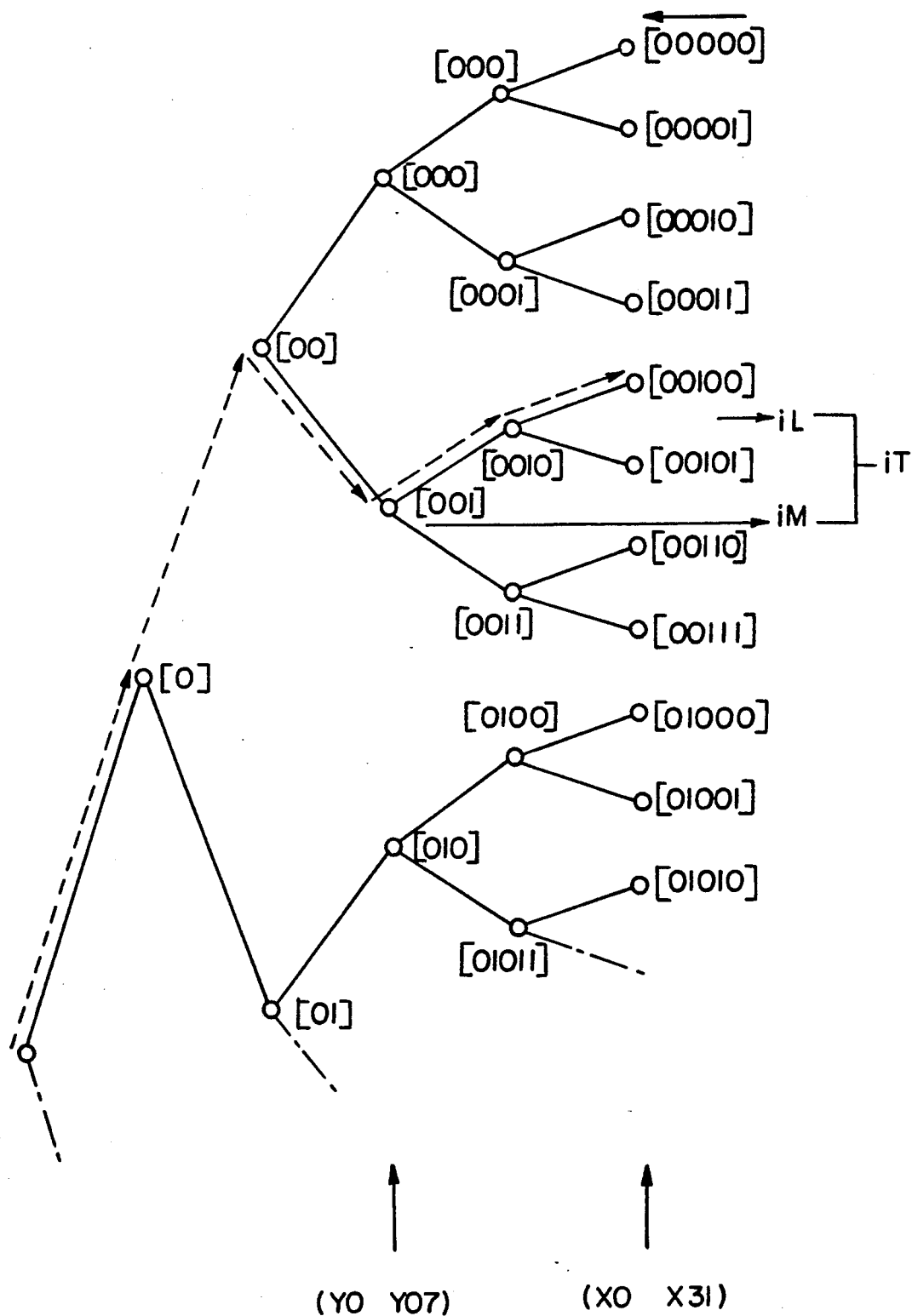
FIG. 19 shows a construction of a retrieval tree.

In FIG. 18, 40 refers to a sending terminal and 41 to a receiving terminal. A vector forming section 401 forms a 16-dimensional pixel vector (4 pixels×4 lines=16 pixels) of the digital video data inputted line by line. A VQ section 402 quantizes the vector using a retrieval tree (FIG. 19) and outputs a 5-bit index iT. An index iM consisting of the more significant 3 bits of the index iT indicates the VQ results among 8 VQ levels (Y0 through Y7) at Hierarchy 3. The 5-bit index iT indicates the VQ results among 32 VQ levels (X0 through X31) at Final Hierarchy 5. A cell composing section 403 composes higher-priority cells with the indexes iM and low-priority cells with indexes iL consisting of less significant 2 bits obtained only at Hierarchy 4 and 5. A cell decomposing section 404 analyzes and removes the cell headers, and stores iM and iL in different memories. A vector restoring section 405 restores each vector from the 5-bit index iT and stores the vector in a frame memory within the section 405. A frame synchronizing section 406 adds a synchronization signal to the digital video data read out from the frame memory.

If any lower-priority cell is discarded during transmission, the vector restoring section 405 restores the vector from iM. Since the vector restored in this way has a smaller VQ distortion in respect to a vector restored from iT, namely, is highly correlated with the original video data, there is no practical image quality deterioration even if the low-priority cells are discarded.

Embodiment IV

Figure 20:
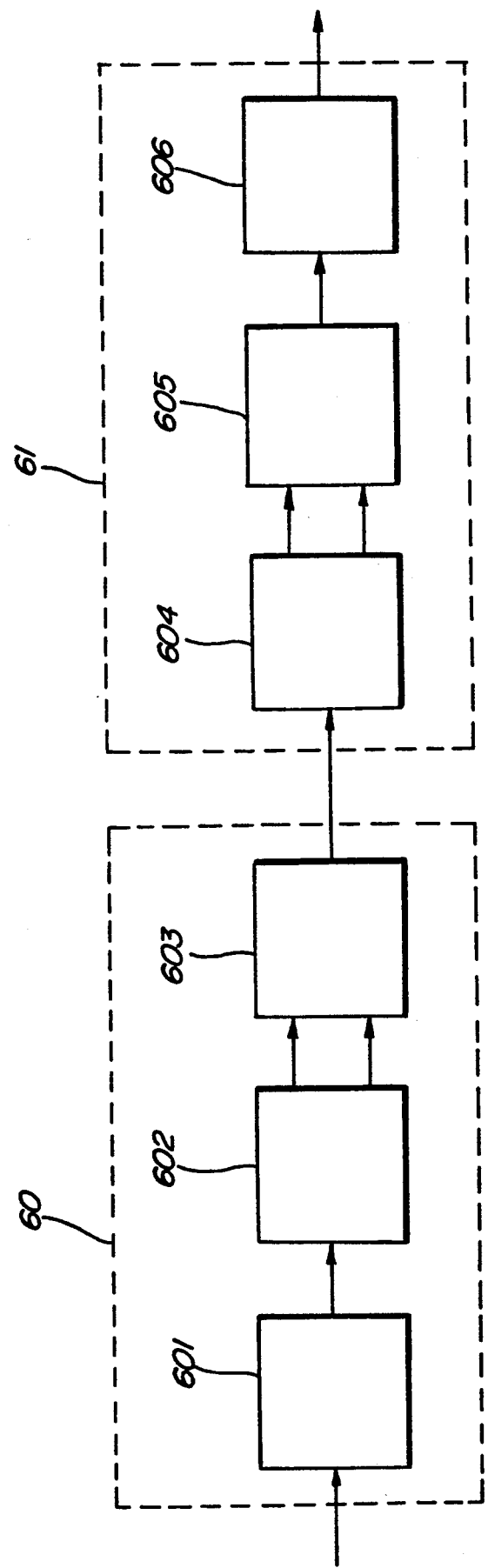
FIGS. 20 through 27 show constructions of still other embodiments of this invention.

FIG. 20 shows a fourth embodiment of this invention, in which VQ is executed using average value data for image processing. 60 refers to a sending terminal and 61 to a receiving terminal. A pixel block forming section 601 forms a 16-pixel block (4 pixels by 4 lines) with the digital video data inputted line by line. A VQ section 602 outputs an average value of the pixel block and a VQ index iB of a 16-dimensional vector vb, which is formed based on data obtained by subtracting the average value from each pixel of the pixel block. A cell composing section 603 composes higher-priority cells with data av indicating average value (will be referred to as average value data, hereinafter) and lower-priority cells with the indexes iB. A cell decomposing section 604 analyzes and removes the cell headers, and stores the average value data av and iB in different memories. A vector restoring section 605 restores the vector vb from iB, adds the average value data av to each element of the vector vb to compose the pixel block, and stores the block in a frame memory within the section 605. A frame synchronizing section 606 adds a synchronization signal to the digital video data read out from the frame memory.

If any lower-priority cell is discarded during transmission, the section 605 composes a pixel block only with the average value data av, which means the pixel block consists of pixels of a uniform level. Since this level is highly correlated with the levels of the surrounding blocks, it is prevented that a block of picture is completely omitted or that a picture with no correlation with those of the surrounding blocks appears.

Embodiment V

Figure 21A:
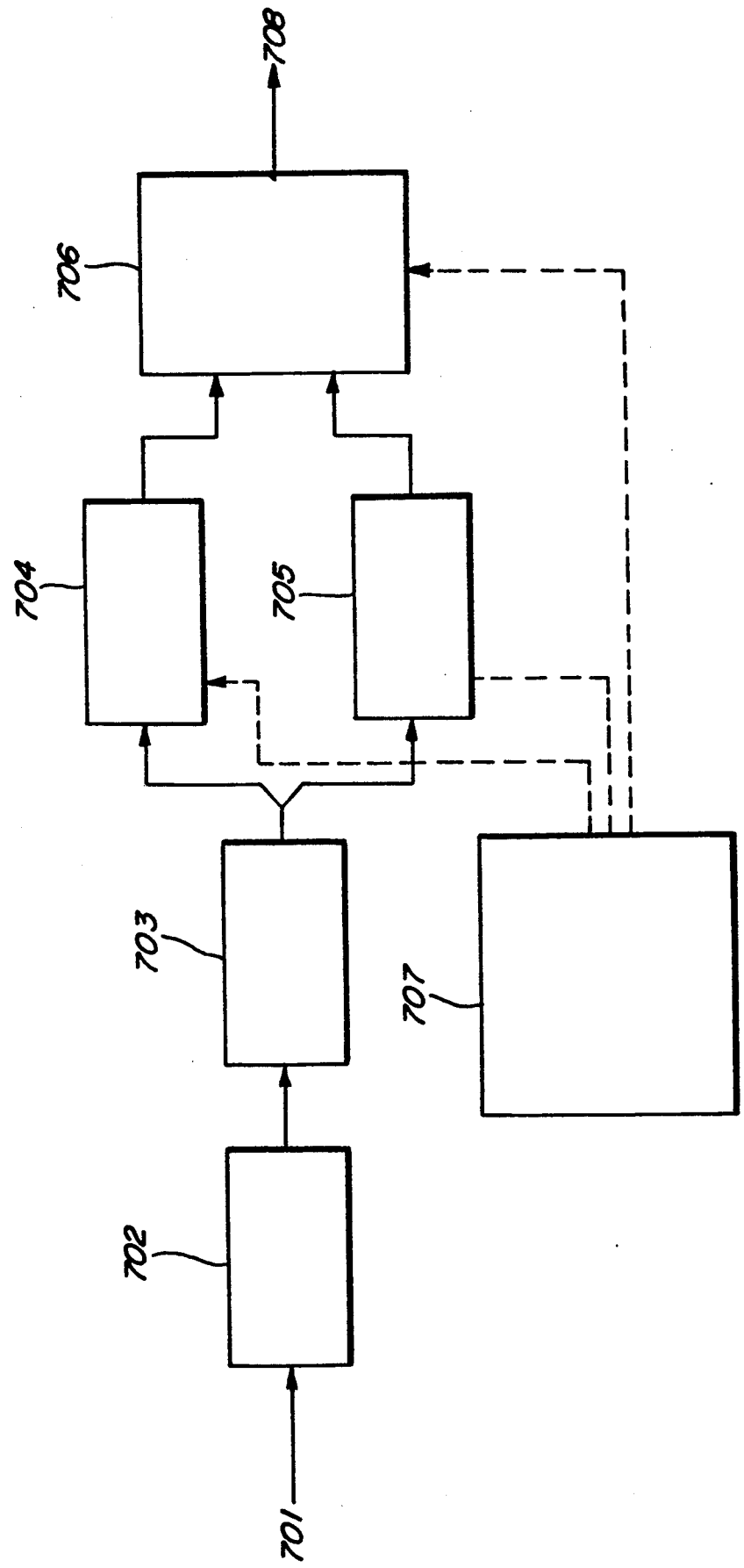
Figure 21B:
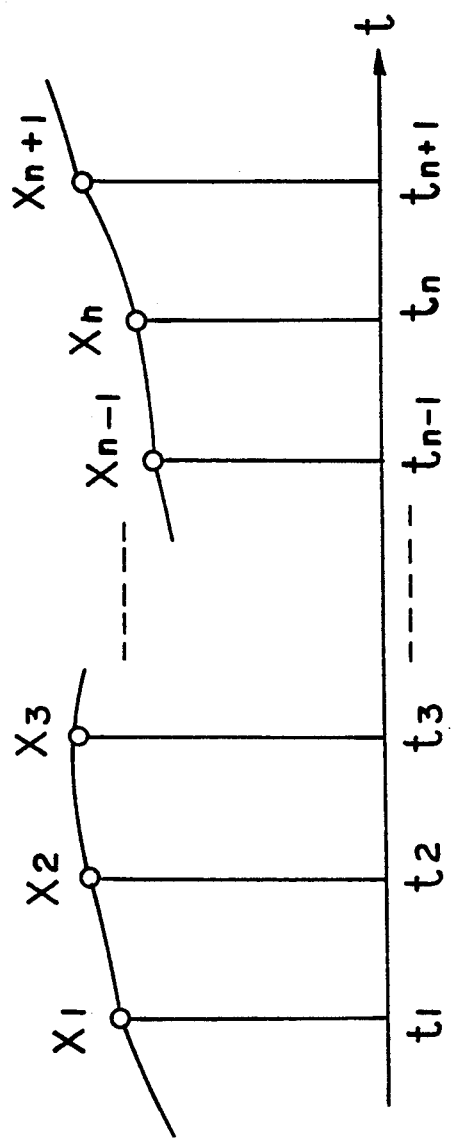
Figure 22:
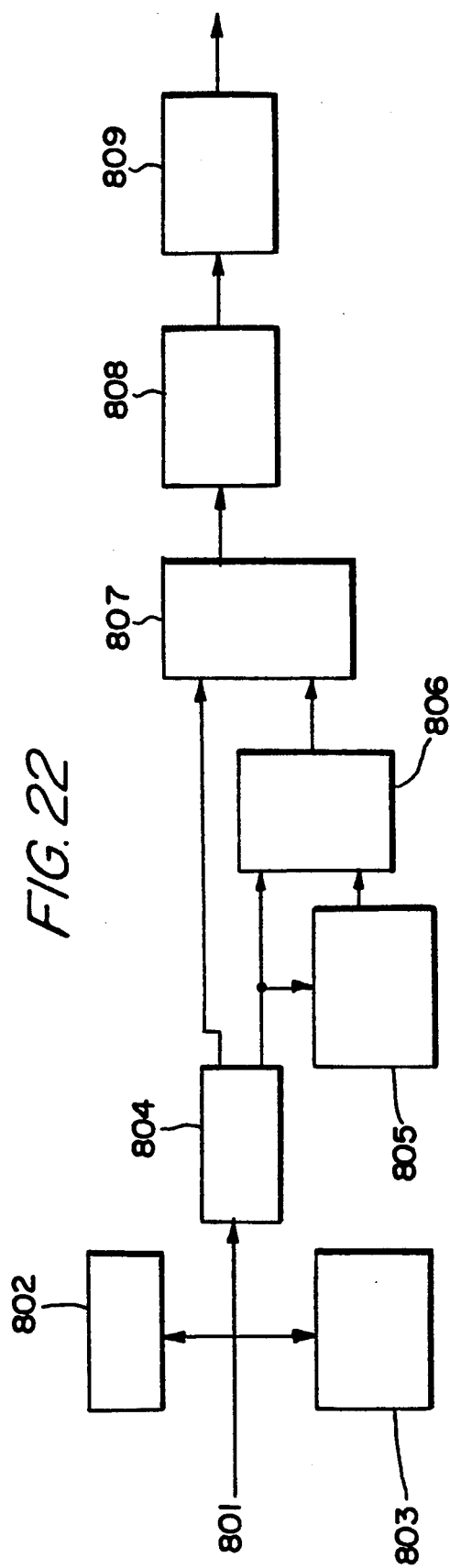

FIGS. 21a, 21b and 22 show a fifth embodiment according to this invention. FIG. 21a shows a construction of a sending terminal. An analog video signal 701 is sampled and converted into a digital video data by an A/D converter 702. In FIG. 21b, $t_n$ indicates the sampling time and $X_n$ indicates the sampled value (pixel data). When n is an odd number, a distributing section 703 sends the sampled value to a memory 704 and when n is an even number, the section 703 sends the sampled value to a memory 705. In this way, the A/D-converted video data are stored in the memories 704 and 705 alternately. When the amount of data stored in each memory reaches the capacity of a cell, the memory sends a cells end-out demand to a header adding seciton 706. Then, the section 706 provides a cell composed of the data from the memory 704 with a header which includes data for assigning higher priority to that cell than another cell composed of the data from the memory 705. A timing circuit 707 controls timing of writing into and reading from the memories.

If the two memories send the demand simultaneously, the section 706 responds to the demand from the memory 704 immediately but to the demand from the memory 705 only after a certain period of time. In other words, the higher-priority cell is sent out first and the lower-priority cell is sent out after waiting for a certain period of time. This operation of the section 706 will be described in detail.

When receiving the demand from the memory 704, the section 706 adds a header to the data from the memory 704 and sends it out as a cell 708 to be transmitted. When receiving the demand from the memory 705, however, the section 706 operates in a different way. The section 706 has a counter for counting up the number of the demands received from the memory 705. When the value of the counter exceeds a certain level (N), lower-priority cells are composed in the surplus number of the demands. If N is set appropriately, the lower-priority cells are sent out with delay even if the demand is sent from the two memories simultaneously.

The cell sent from the sending terminal reaches a receiving terminal through a transmission channel. The channel is controlled not to discard the higher-priority cells in the switching board. In other words, a larger buffer memory is provided for the higher-priority cells than for the lower-priority cells. Accordingly, it often happens that the higher-priority cell requires longer transmission time than the lower-priority cell. Especially when the channel is a complicated network, transmission time tends to vary greatly depending on the path each cell follows. When the higher-priority cell and the lower-priority cell from the same pixel block are sent together, the value of N should be set so that the former cells arrive at the receiving terminal earlier than the latter cells.

FIG. 22 shows a construction of the receiving terminal. A synchronizing section 803 synchronizes timing of operating each section and of receiving of a cell 801. An analyzing section 802 analyzes and removes the cell header. Based on the analysis, a distributing section 804 distributes the data from the higher-priority cells (n: odd number) and the data from the lower-priority cells (n: even number) to different destinations. The former is sent to an interpolating data forming section 805 and also to a switch 806. The section 805 obtains an average of two adjacent odd-numbered cell data and sends it to the switch 806 as an interpolating data of the even-numbered cell data between the above two odd-numbered cell data. For writing the data in a memory 807, the switch 806 outputs the odd-numbered cell data as it is, but outputs the interpolating data as the even-number cell data.

The lower-priority cell is sent from the distributing section 804 to the memory 807. Even if any lower-priority cell is discarded during transmission, the data corresponding with the data in that cell has already been written in the memory 807 in the form of the interpolating data.

A reading-out circuit 808 reads out the data from the memory 807. The circuit 808 is controlled to read out the data after the data in the lower-priority cell is written but before the data in the higher-priority cell and the interpolating data are written. In other words, if the lower-priority cells have not arrived by a specified time (by the time data from the higher-priority cell of the corresponding block of the next frame arrive for data update), the interpolating data is read out.

A D/A converter 809 converts the data read out from the memory 807 into an analog video signal 810.

Embodiment VI

Figure 23:
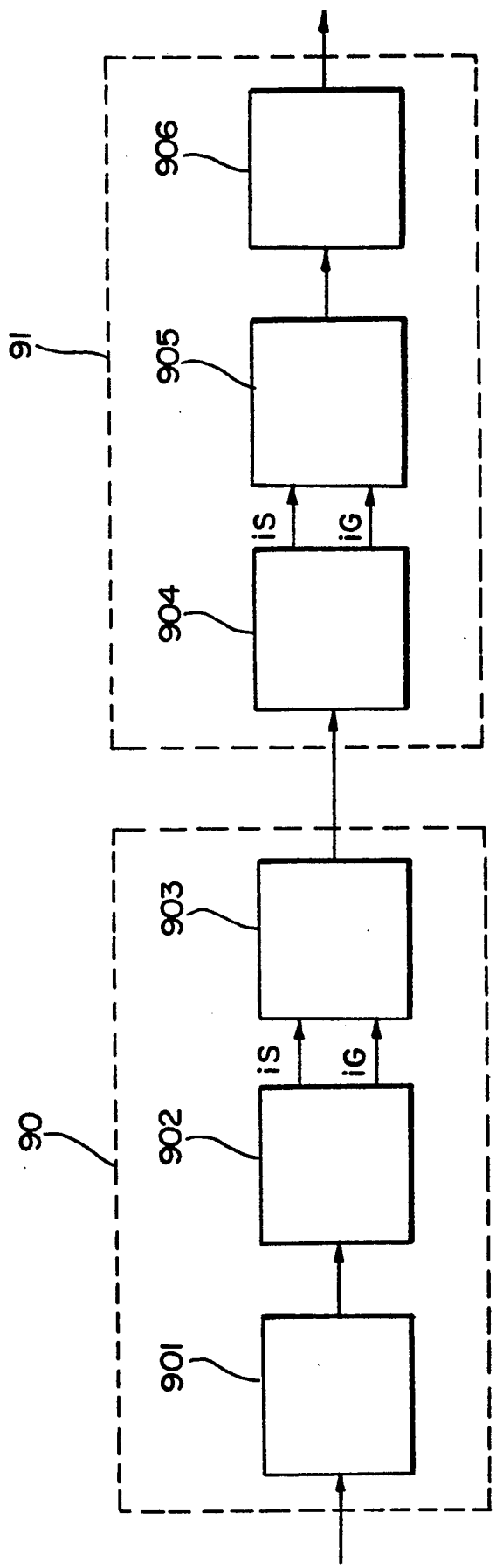

FIG. 23 shows a sixth embodiment according to this invention, which employs gain/shape VQ for image processing. 90 refers to a sending terminal and 91 to a receiving terminal. A vector forming section 901 forms a 16-pixel vector (4 pixels by 4 lines) with the digital video data inputted line by line. A gain/shape VQ section 902 outputs an index iS and index iG. The index iS is of a shape vector having the highest correlation with the pixel vector, and an index iG is of a gain vector having the highest correlation with a vector obtained by subtracting the shape vector from the pixel vector. A cell composing section 903 composes higher-priority cells with the indexes iS and lower-priority cells with the indexes iG. A cell decomposing section 904 analyzes and removes the cell headers, and stores iS and iG in different memories. A gain/shape vector restoring section 905 restores the vector using iS and iG, synthesizes the two vectors into a pixel vector and stores it in the frame memory within the section 905. A frame synchronizing section 906 adds a synchronization signal to the digital video data read out from the frame memory.

If any lower-priority cell is discarded during transmission, the section 905 restores only the shape vector using iS and outputs it as a pixel vector. Since the shape vector is obtained by roughly quantizing the digital video data, image quality is lowered in detail but practical deterioration is small.

Embodiment VII

Figure 24:
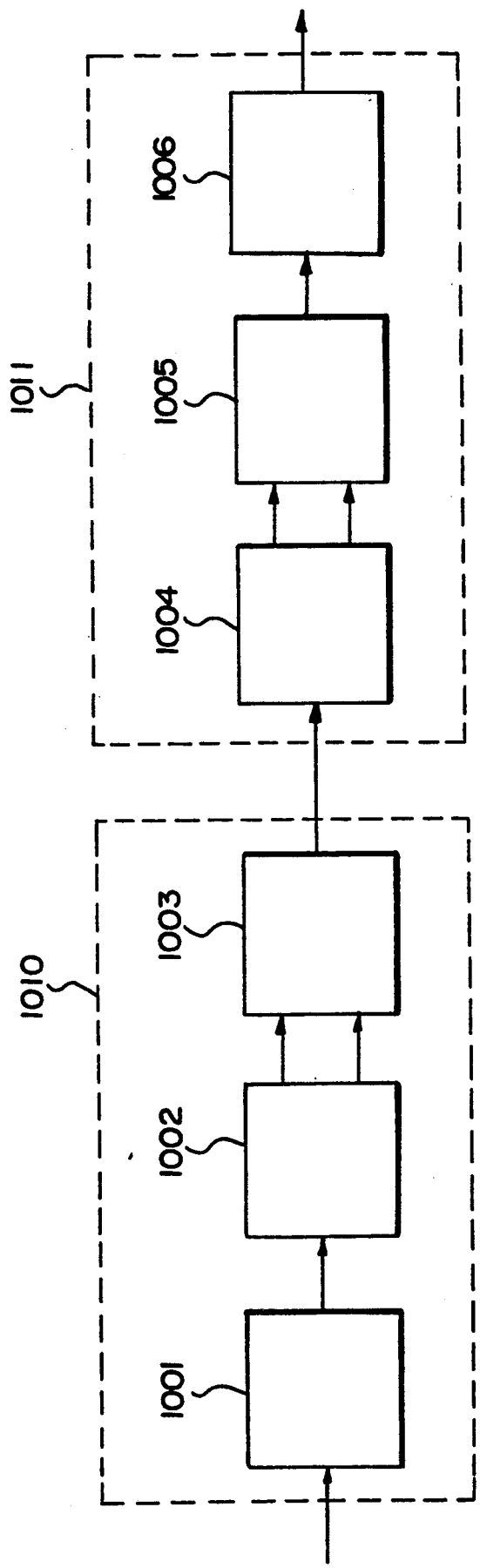

FIG. 24 shows a seventh embodiment of this invention, which employs BTC (block truncation coding) for image processing. 1010 refers to a sending terminal and 1011 to a receiving terminal. A pixel block forming section 1001 forms a 16-pixel block (4 pixels by 4 lines) with the digital video data inputted line by line. A BTC section 1002 outputs an average value data av of the pixel block, a 16-bit data si, and a standard deviation va of the pixel block. Each bit of the 16-bit data indicates whether each of the 16 pixels of the pixel block is larger or smaller than the average value data av. A cell composing section 1003 composes higher-priority cells with the average value data va and lower-priority cells with the data si and the standard deviation va. A cell decomposing section 1004 analyzes and removes the cell headers, and stores av, si and va in different memories. A BTC decoding section 1005 restores the pixel block from av, si and va and stores the block in the frame memory within the decoder 1005. A frame synchronizing section 1 006 adds a synchronization signal to the digital video data read out from the frame memory.

If any lower-priority cell is discarded during transmission, the BTC decoding section 1005 restores the pixel block only with the average value data av, which means the pixel block consists of pixels of a uniform level. Since this level is highly correlated with the levels of the surrounding blocks, a picture with no correlation with those of the surrounding blocks is prevented and a natural-looking image is obtained.

Embodiment VIII

Figure 25:
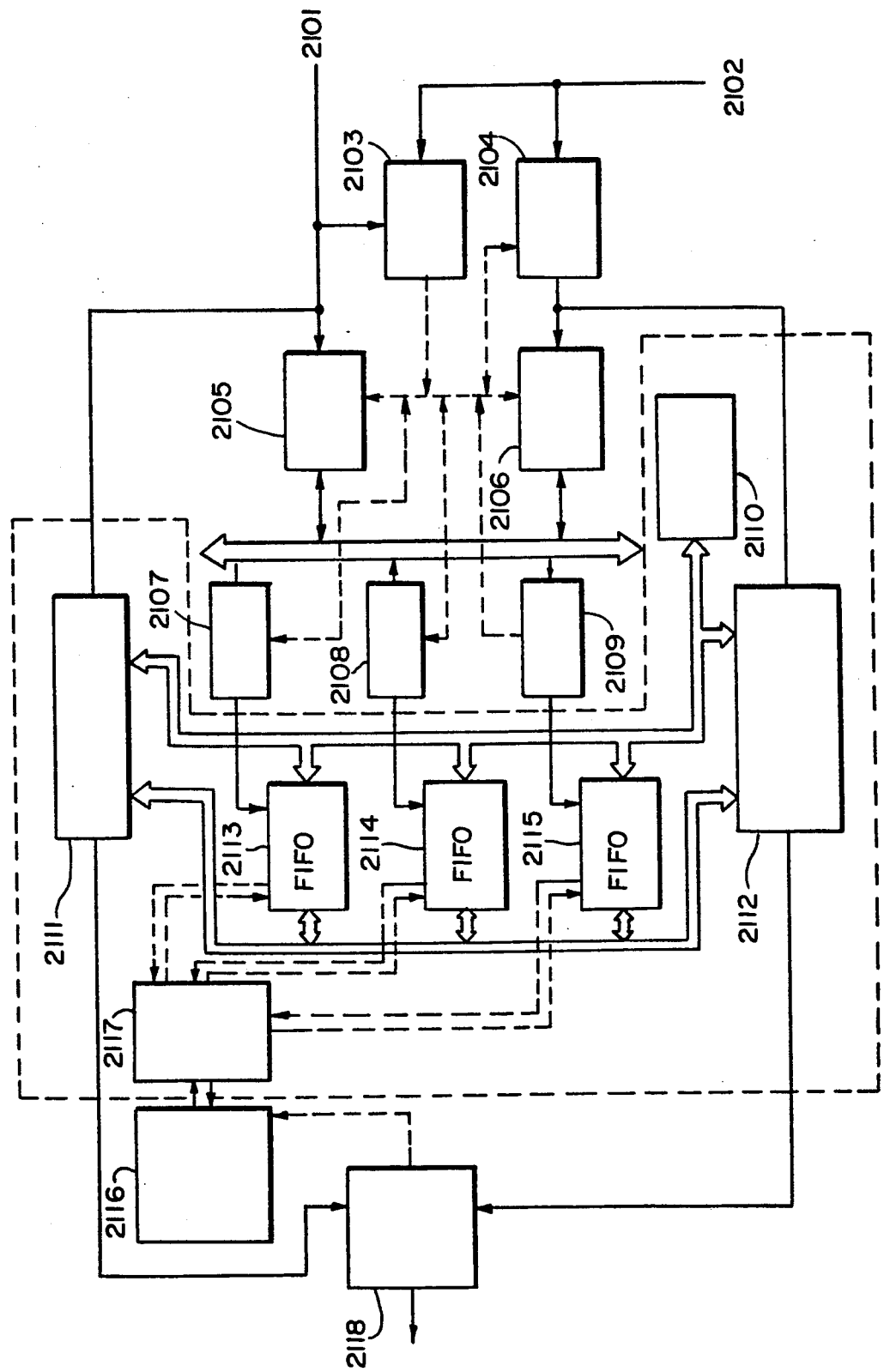

FIG. 25 shows an eighth embodiment of this invention, which is a cell multiplexer for multiplexing cells sent from a plurality of sending terminals. ATM cells 2101 and 2102 inputted from two input terminals have their phases (receiving timing of each cell) judged by a timing circuit 2103. The cell 2102 is sent to a memory 2104, where it waits to be sent out so that the two cell headers are sent out simultaneously. The headers are extracted by header extracting sections 2105 and 2106 and their priority levels are discriminated by header discrimination circuits 2107, 2108 and 2109. (There is another method by which the priority levels of cells are determined in accordance with their addresses.) The cell is stored in the buffer memory 2111 (buffer memory I) or 2112 (buffer memory II), in an area allocated for the address indicated by an address counter 2110. At the same time, the address and the number of the buffer memory (I or II) which stores the cell are stored in a FIFO 2113, 2114 or 2115. If the cell has the highest priority, its data is stored in the FIFO 2113 following the command from the circuit 2107. If the cell has the lowest priority, its data is stored in the FIFO 2115 following the command from the circuit 2109. A cell determination circuit 2116 determines which cell is to be transmitted next based on the length of a queue in each FIFO and the capacity of the transmission channel. When the determination is made and a reading control circuit 2117 outputs a control signal in accordance with the determination, the number of the buffer memory and the address concerning the selected cell are outputted from the FIFO 2113, 2114 or 2115 to the relevant buffer memory. Then, the cell is sent to a cell multiplexing circuit 2118 to be multiplexed and outputted.

Embodiment IX

Figure 26:
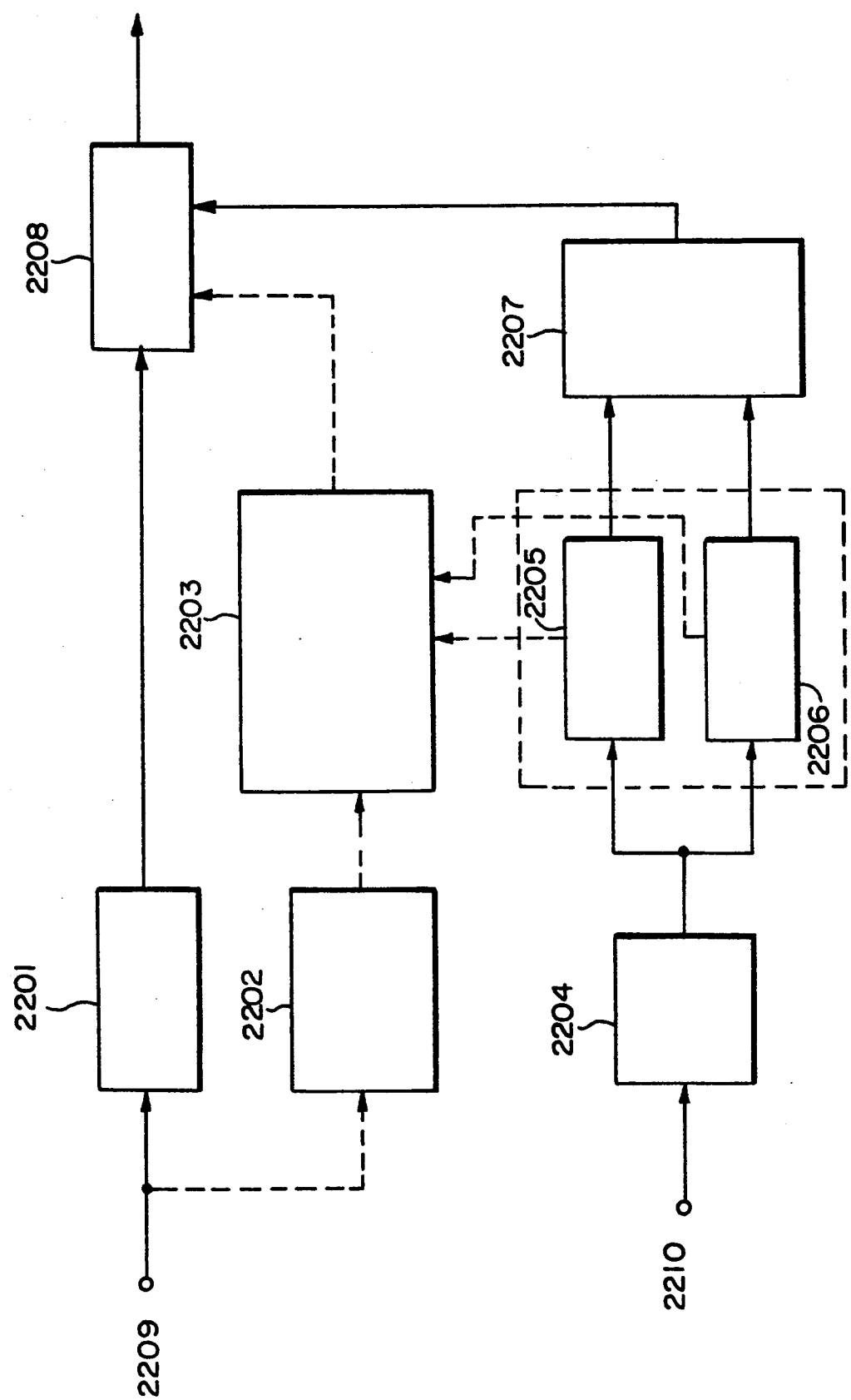

FIG. 26 shows a ninth embodiment of this invention. A received cell 2209 is stored in a buffer memory 2201 only while its header is analyzed. The header is analyzed by a priority level discrimination circuit 2202, whereby the priority level of the header is discriminated. A video signal 2210 is converted into a digital video data and high-efficiency-coded by a video data coder 2204. Among the high-efficiency-coded data, the higher-priority data are stored in a buffer memory 2205 and the lower-priority data are stored in a buffer memory 2206. A cell determination circuit 2203 determines which cell is to be transmitted next based on the length of a queue in each buffer memory, the number of cells classified by priority level, and the number of transmittable cells. A switch 2208 sends out the selected cell. If the length of the queue in the buffer memory 2205 is above a specified level and the transmission channel is full, the lower-priority cells from the buffer memory 2201 are discarded even if they are inputted.

Embodiment X

Figure 27:
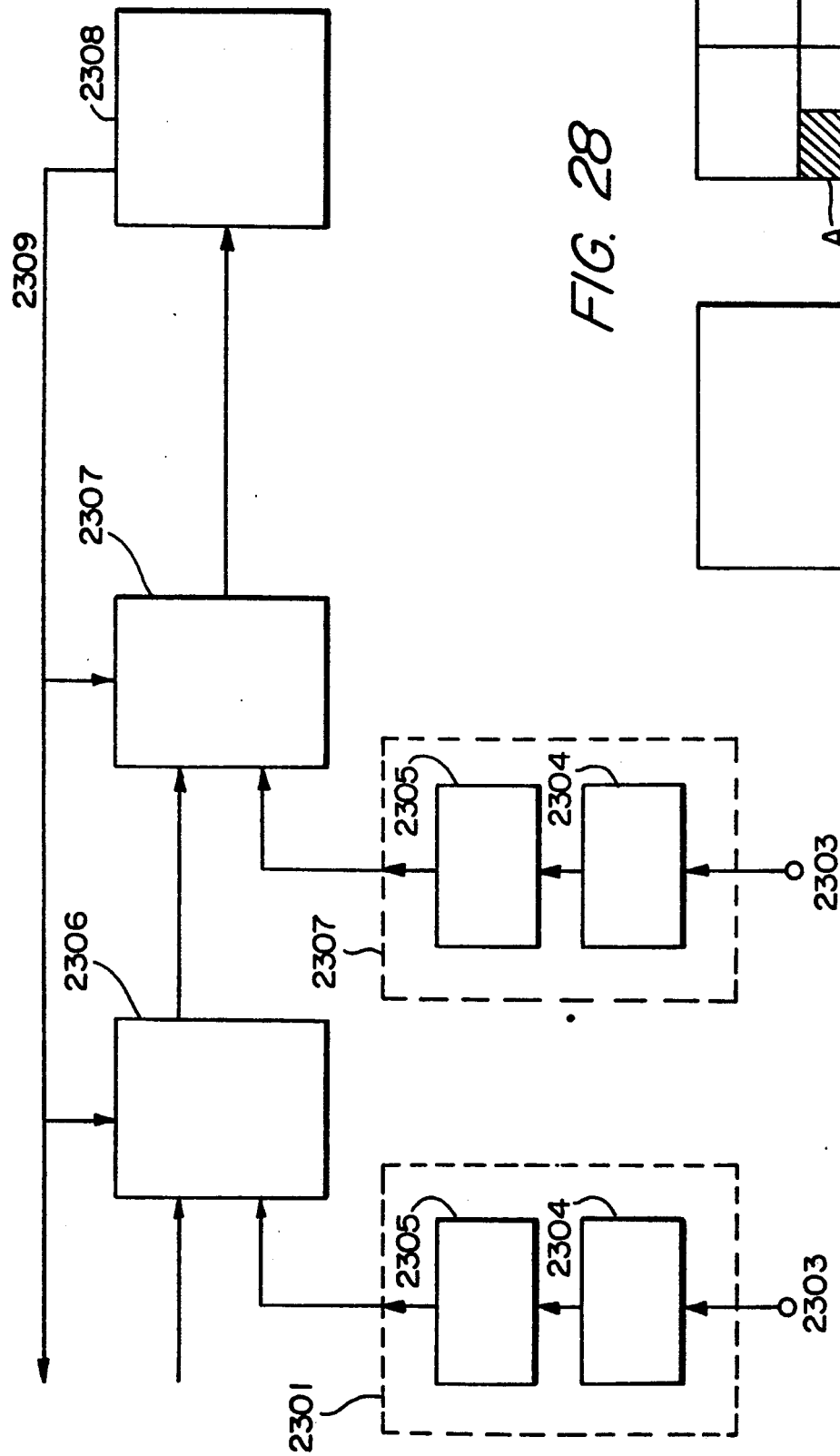

FIG. 27 shows a tenth embodiment of this invention applied to a monitoring system in which a plurality of cell sending terminals are connected serially. In a cell sending terminal 2302, a video signal 2303 is converted into a PCM data by a coder 2304. Then, a 16-pixel block is formed, which is classified as a moving picture block or a still picture block. The data of the still picture block is not transmitted. The data of the moving picture block is discrete-cosine-transformed. In a cell composing section 2305, a first group of cells are composed with coefficient C00, a second group of cells with C01, C10 and C11, and a third group of cells with the remaining coefficients. The priority level regarding cell discard prohibition is set as the first group > the second group > the third group. The cell is sent to a cell multiplexing node 2307 and then to a central unit 2308. The central unit 2308 extracts the coefficient from the cell and restores the original video signal by IDCT. The video signal is used to monitor each terminal. A sending terminal 2301 and a cell multiplexing node 2306 are operated in the same way as the terminal 2302 and the node 2307, respectively. The node 2307 receives the cells from the terminal 2302 and also from the node 2306 and other nodes farther from the central unit. The node 2307 multiplexes cells in accordance with algorithm explained in FIGS. 25 and 26.

Figure 28:
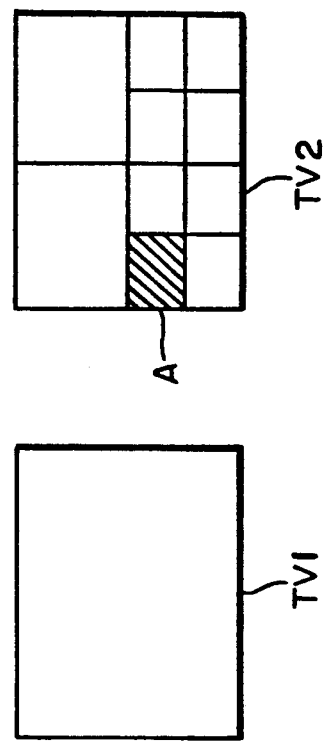
FIG. 28 is a view for explaining operation of the system shown in FIG. 27.

Monitoring operation at the central device 2308 will be explained with reference to FIG. 28. At a monitoring station, 11 terminals are monitored with two TVs. TV1 has an image on the whole thereof. The screen of TV2 is divided into four, two of them being further divided into four. Accordingly, there are 11 screen units for 11 terminals. It is generally known that an image can be restored in quarter the size of the original both in length and width by using the DC components (C00) obtained by discrete-cosine-transforming a 16-pixel block. In the same way, an image can be restored in half the size of the original both in length and width by using C00, C01, C10, C11. If a building monitored by Screen A of TV2 gets on fire and a detailed data is necessary, the central unit 2308 sends a highest priority terminal selection data to the relevant node (for example, 2307). The terminal 2302 obtains the highest priority through the node 2307. As a result, the data from the terminal 2302 is restored on the whole screen of TV1 clearly and in detail. If the transmission channel has no room for the data from the terminal 2302, the cells sent from the terminals farther from the central unit are discarded. The cells to be discarded are for the smaller screen units on TV2.

In Embodiments III through VII as well as in I and II, whether each cell is of a moving picture block, a still picture block or a transfer picture block may also be considered in determining its priority level.

Although the present invention has been fully described by way of embodiments with references to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A video cell sending terminal for sending video cells to a transmission channel for use in a transmission system which is for packaging digital video data into a cell and transmitting the same, the terminal comprising:
   classifying means for classifying digital video data into at least two groups of coefficients, a first of which would cause image quality a drastic damage if discarded and a second of which would cause little damage even if discarded;
   cell composing means for composing a cell with each group of coefficients;
   priority level assigning means for assigning a higher priority regarding cell discard prohibition to the cell composed of the first group of coefficients and a lower priority to the cell composed of the second group of coefficients; and
   sending means for sending out the cell which has been assigned a priority level.

2. A terminal of claim 1, further comprising:
   dividing means for dividing the digital video data into blocks each consisting of a plurality of pixels; and
   coding means for discrete-cosine-transforming the digital video data to convert the same into transform coefficients block by block;
   wherein the coefficients are divided into DC and low-frequency coefficients and high-frequency coefficients, and the cell composed with the DC and low-frequency coefficients is assigned higher priority and the cell composed with the high-frequency coefficients is assigned lower priority.

3. A terminal of claim 1, further comprising:
   dividing means for dividing the digital video data into pixel blocks each consisting of a plurality of pixels; and
   coding means for discrete-cosine-transforming the digital video data to convert the same into transform coefficients block by block;
   wherein the coefficients are divided into more significant bits and less significant bits, and the cell composed with the more significant bits is assigned higher priority and the cell composed with the less significant bits is assigned lower priority.

4. A terminal of claim 1, further comprising:
   dividing means for dividing the digital video data into pixel blocks each consisting of a plurality of pixels; and
   vector quantizing means for vector-quantizing the digital video data block by block using a retrieval tree;
   wherein the vector-quantized digital video data are divided into a first group of data which is obtained at a hierarchy level closer to a root of the retrieval tree and a second group of data which is obtained at another hierarchy level farther from the above root, and the cell composed with the first group of data is assigned higher priority and the cell composed with the second group of data is assigned lower priority.

5. A video cell sending terminal for sending video cells to a transmission channel for use in a transmission system which is for packaging digital video data into a cell and transmitting the same, the terminal comprising:
   classifying means for classifying digital video data into at least two groups of coefficients, a first of which would cause image quality a drastic damage if discarded and a second of which would cause little damage even if discarded;
   cell composing means for composing a cell with each group of coefficients;
   priority level assigning means for assigning a higher priority regarding cell discard prohibition to the cell composed of the first group of coefficients and a lower priority to the cell composed of the second group of coefficients;
   sending means for sending out the cell which has been assigned a priority level;
   dividing means for dividing the digital video data into pixel blocks, each consisting of a plurality of pixels; and
   vector quantizing means for obtaining an average value data of each pixel block and further vector-quantizing a data obtained by subtracting the average value data from each pixel of the pixel block to obtain indexes;

wherein the cell composed with the average value data is assigned higher priority and the cell composed with the indexes is assigned lower priority.

6. A terminal of claim 1, wherein:

said classifying means classifies the digital video data into sub-sampled pixel data and remaining pixel data;

said priority level assigning means assigns higher priority to a first cell composed the sub-sampled pixel data and lower priority to a second cell composed of the remaining pixel data; and said cell sending means sends the second cell later than the first cell to assure the first cell arrives at a receiving terminal earlier than the second cell.

7. A video cell sending terminal for sending video cells to a transmission channel for use in a transmission system which is for packaging digital video data into a cell and transmitting the same, the terminal comprising:

classifying means for classifying digital video data into at least two groups of coefficients, a first of which would cause image quality a drastic damage if discarded and a second of which would cause little damage even if discarded;

cell composing means for composing a cell with each group of coefficients;

priority level assigning means for assigning a higher priority regarding cell discard prohibition to the cell composed of the first group of coefficients and a lower priority to the cell composed of the second group of coefficients;

sending means for sending out the cell which has been assigned a priority level;

dividing means for dividing the digital video data into pixel blocks, each consisting of a plurality of pixels; and vector quantizing means for gain/shape vector-quantizing the digital video data block by block to obtain shape vector quantizing indexes and gain vector quantizing indexes;

wherein the cells composed with the shape vector quantization indexes is assigned a higher priority and the cell composed with the gain VQ indexes is assigned a lower priority.

8. A video cell sending terminal for sending video cells to a transmission channel for use in a transmission system which is for packaging digital video data into a cell and transmitting the same, the terminal comprising:

classifying means for classifying digital video data into at least two groups of coefficients, a first of which would cause image quality a drastic damage if discarded and a second of which would cause little damage even if discarded;

cell composing means for composing a cell with each group of coefficients;

priority level assigning means for assigning a higher priority regarding cell discard prohibition to the cell composed of the first group of coefficients and a lower priority to the cell composed of the second group of coefficients;

sending means for sending out the cell which has been assigned a priority level;

dividing means for dividing the digital video data into pixel blocks, each consisting of a plurality of pixels; and BTC (block truncation coding) means for obtaining an average value, bit data, each bit of which indicates whether each pixel data is larger or smaller than the average value, and a standard deflection of the digital video data;

wherein data indicating the average value are classified as a first group of data and the bit data and the standard deflection are classified as a second group of data, and the cell composed with the first group of data is assigned higher priority, and the cell composed with the second group of data is assigned lower priority.

9. A terminal of claim 1, further comprising sequential number providing means for providing a plurality of cells obtained by segmenting a video packet with sequential numbers from the leading cell.

10. A video cell sending terminal for sending video cells to a transmission channel for use in a transmission system which is for packaging digital video data into a cell and transmitting the same, the terminal comprising:

dividing means for dividing the digital video data into pixel blocks each consisting of a plurality of pixels; and judging means for comparing each block of a current frame with the corresponding block of a frame immediately prior to the current frame and for judging whether the block is a moving picture block or a still picture block and further whether the still picture block is a transfer picture block or not, the transfer picture block meaning a very first still picture block altered from a moving picture block;

coding means for discrete-cosine-transforming the digital video data of at least the moving picture block and the transfer picture block to convert the same into transform coefficients;

classifying means for classifying the transform coefficients obtained from the moving picture block into low-frequency coefficients and high-frequency coefficients;

a first cell sending means for composing a cell with still picture block judgment data obtained by said judging means and sending the same;

a second cell sending means for composing a cell with the transform coefficients obtained form the transfer picture block and sending the same;

a third cell sending means for composing a cell with either of the low-frequency coefficients and the high-frequency coefficients and sending the same;

moving/still picture judgment data mark providing means for providing the cell sent by said first cell sending means with a mark indicating the cell is of moving/still picture judgment data; and priority level assigning means for assigning lower priority regarding cell discard prohibition to the cell composed with the high-frequency coefficients and assigning higher priority to the other cell.

11. A terminal of claim 10, further comprising a sequential number providing means for providing each cell with a sequential number when at least said third cell sending means composes the lower-priority cell.

12. A video cell receiving terminal for receiving video cells and for restoring a video, said terminal being for use in a transmission system for packaging digital video data into a cell and transmitting the same, the terminal comprising:

priority level judging means for judging priority levels of video cells;

cell classifying means for classifying the video cells in accordance with the priority levels;

discarded data compensating means for judging whether a cell having lower priority has been discarded and in the case of cell discard, compensating data of the discarded cell with data of existent cells; and synthesizing means for synthesizing data from cells classified by said cell classifying means and data compensated by said discarded data compensating means into digital video data.

13. A terminal of claim 12, wherein said discarded data compensating means discriminates a sequential number written in a certain area of each cell and detects cell discard if any number is omitted.

14. A video cell receiving terminal for receiving video cells and for restoring a video, said terminal being for use in a transmission system for packaging digital video data into a cell and transmitting the same, the terminal comprising:

cell analyzing means for analyzing a header of a received cell and judging whether the cell is of moving/still picture judgment data or not and whether the cell is assigned higher priority or lower priority regarding cell discard prohibition;

transfer picture block data extracting means for detecting a transfer picture block based on the moving/still picture judgment data obtained by said cell analyzing means and extracting data from a cell of the transfer picture block among the cells with the higher priority;

moving picture block data extracting means for extracting data from a cell of a moving picture block among the cells with the higher priority and the lower priority;

discarded data compensating means for judging whether a cell having lower priority has been discarded and in the case of cell discard, compensating data of the discarded cell with data of existent cells;

IDCT means for inverse-discrete-cosine-transforming data from cells of the transfer picture block and the moving picture block and the data compensated by said discarded data compensating means; and video restoring means for restoring a video of each frame based on the video data which is inverse-discrete-cosine-transformed by said IDCT means and on the moving/still picture judgment data.

15. A transmission system comprising a sending terminal for packaging digital video data into a cell and sending the same and a receiving terminal for receiving the cells and restoring a video, wherein:

a sending terminal comprises dividing means for dividing digital video data into a first group of components which would cause image quality a drastic damage if discarded and a second group of components which would cause little damage even if discarded; cell composing means for composing cells with each group of components; and priority level assigning means for assigning higher priority to the cell composed with the first group of components than to the cell composed with the second group of components; and a receiving terminal comprises cell classifying means for classifying received cells in accordance with priority levels; cell discard judging means for judging cell discard; and compensating means for compensating at least data of the discarded cell with a specified data in the case of cell discard.

16. A transmission system for packaging digital video data into a cell and transmitting the same, said system comprising:

a plurality of cell sending terminals having a function of dividing video data into a first cell group which would cause image quality a drastic damage if discarded and a second cell group which would cause little damage even if discarded;

a central unit for restoring a video from data sent from said cell sending terminals; and a plurality of node devices for connecting said cell sending terminals and said central unit serially, each of said node devices having a priority cell multiplexing circuit for multiplexing the first group of cells, with priority, among cells sent from a terminal which is connected thereto and cells sent from another terminal which is connected to another node farther from the central unit than its own node device.

17. A system of claim 16, wherein each fo said cell multiplexing circuit comprises:

at least an input terminal port for a cell sent from a circuit farther from the central unit than its own node device;

a buffer memory for adjusting timing of inputting the cell through said input port;

a discrimination circuit for discriminating a priority level written in the header of the cell inputted from the terminal farther from the central unit than its own node device;

a cell determination circuit for determining which cell is to be transmitted next based on the number of cells transmittable from the terminal connected to its own node device, the cells being classified by priority level, and on the priority level discriminated by said discrimination circuit; and a cell sending circuit for sending the cell selected by said cell determination circuit.

18. A system for transmitting and receiving digital video data comprising:

block forming means for forming said digital video data into blocks of digital video data;

dividing means for dividing said blocks into at least two discard priority groups, a first group containing digital video data that will not substantially reduce video quality if discarded, and a second group containing digital video data that will substantially reduce video quality if discarded;

means for assigning a discard priority classification to a block or gorup of blocks in accordance with said dividing means;

means for transmitting said blocks over a transmission channel, said first group of blocks being subject to discard by said transmission channel, and means for receiving blocks transmitted over said transmission channel and for compensating for any blocks that were discarded during transmission.

* * * * *